United States Patent
DeLanghe et al.

(10) Patent No.: US 12,058,090 B2
(45) Date of Patent: Aug. 6, 2024

(54) METHOD, APPARATUS, AND COMPUTER PROGRAM PRODUCT FOR ORGANIZATIONAL TELEMETRY DISCOVERY WITHIN A GROUP BASED COMMUNICATION SYSTEM

(71) Applicant: Slack Technologies, Inc., San Francisco, CA (US)

(72) Inventors: Jaime DeLanghe, New York, NY (US); Andrew Schmidt, San Francisco, CA (US); Joseph Delgado, New York, NY (US); Jonathan Katzur, New York, NY (US); Japinder Singh, New York, NY (US); Joshua Wills, San Francisco, CA (US); Simon Favreau-Lessard, New York, NY (US); Noah Weiss, New York, NY (US); Luis Tandalla, New York, NY (US); Ashoke Chakrabarti, Alameda, CA (US)

(73) Assignee: Salesforce, Inc., San Francisco, CA (US)

( * ) Notice: Subject to any disclaimer, the term of this patent is extended or adjusted under 35 U.S.C. 154(b) by 23 days.

(21) Appl. No.: 16/778,416

(22) Filed: Jan. 31, 2020

(65) Prior Publication Data

US 2020/0169518 A1 May 28, 2020

Related U.S. Application Data

(63) Continuation-in-part of application No. 16/526,666, filed on Jul. 30, 2019, now Pat. No. 11,252,537.
(Continued)

(51) Int. Cl.
*H04L 51/08* (2022.01)
*H04L 12/18* (2006.01)
(Continued)

(52) U.S. Cl.
CPC ............ *H04L 51/08* (2013.01); *H04L 12/185* (2013.01); *H04L 51/234* (2022.05); *H04L 51/42* (2022.05)

(58) Field of Classification Search
CPC ......... H04L 51/08; H04L 51/34; H04L 51/22; H04L 12/185; H04L 51/18; H04L 51/32
See application file for complete search history.

(56) References Cited

U.S. PATENT DOCUMENTS

| | | | |
|---|---|---|---|
| 7,644,144 B1 | 1/2010 | Horvitz et al. | |
| 8,938,500 B1* | 1/2015 | Acharya | G06Q 50/01 709/204 |

(Continued)

OTHER PUBLICATIONS

Office Action for U.S. Appl. No. 17/407,891, mailed on Aug. 11, 2022, Delanghe, "User Account Telemetry Within a Communication Platform", 18 pages.
(Continued)

*Primary Examiner* — Harry H Kim
*Assistant Examiner* — Mohammed M Murshid
(74) *Attorney, Agent, or Firm* — Lee & Hayes, P.C.

(57) ABSTRACT

Embodiments of the present disclosure provide methods, systems, apparatuses, and computer program products for discovery of organizational telemetry within a group-based communication system and rendering representations thereof. An interaction signal trends interface is generated based in part on an ordered interaction signal data structures list that is generated based in part on predicted short term interaction signal tallies, actual short term interaction signal tallies, and predicted long term interaction signal tallies.

24 Claims, 32 Drawing Sheets

Related U.S. Application Data

(60) Provisional application No. 62/712,047, filed on Jul. 30, 2018.

(51) Int. Cl.
   *H04L 51/234* (2022.01)
   *H04L 51/42* (2022.01)

(56) References Cited

U.S. PATENT DOCUMENTS

| | | | |
|---|---|---|---|
| 9,047,259 B1* | 6/2015 | Ho | G06F 40/134 |
| 9,098,176 B1 | 8/2015 | Tauber et al. | |
| 9,171,083 B2 | 10/2015 | Blumenfeld et al. | |
| 9,317,609 B2 | 4/2016 | Blumenfeld et al. | |
| 9,633,399 B2 | 4/2017 | George et al. | |
| 9,940,394 B1 | 4/2018 | Grant et al. | |
| 9,961,519 B1* | 5/2018 | Ashe | G06F 16/2379 |
| 10,021,059 B1 | 7/2018 | Rao | |
| 10,209,956 B2 | 2/2019 | Fletcher et al. | |
| 10,361,875 B2 | 7/2019 | Krug et al. | |
| 10,375,432 B1 | 8/2019 | Matthews | |
| 10,482,090 B2* | 11/2019 | Ball | G06F 16/24578 |
| 10,693,828 B2* | 6/2020 | Ilic | H04L 51/52 |
| 10,783,208 B1* | 9/2020 | Rao | H04L 67/02 |
| 10,783,568 B1 | 9/2020 | Chandra et al. | |
| 10,977,316 B2* | 4/2021 | Filippi | G06T 11/206 |
| 2003/0200145 A1 | 10/2003 | Krassner et al. | |
| 2012/0011204 A1 | 1/2012 | Morin et al. | |
| 2012/0089681 A1* | 4/2012 | Chowdhury | H04L 67/55 |
| | | | 709/206 |
| 2012/0246228 A1 | 9/2012 | Udezue et al. | |
| 2013/0179990 A1* | 7/2013 | Kritt | H04L 63/0846 |
| | | | 726/28 |
| 2013/0185368 A1 | 7/2013 | Nordstrom et al. | |
| 2013/0226578 A1 | 8/2013 | Bolton et al. | |
| 2013/0254376 A1* | 9/2013 | Kudikala | H04L 67/535 |
| | | | 709/224 |
| 2014/0372511 A1 | 12/2014 | Kapadia et al. | |
| 2015/0081725 A1* | 3/2015 | Ogawa | H04L 12/1859 |
| | | | 707/754 |
| 2015/0287094 A1 | 10/2015 | Mowry | |
| 2016/0055160 A1 | 2/2016 | Himel et al. | |
| 2016/0134692 A1 | 5/2016 | Ju et al. | |
| 2016/0259790 A1* | 9/2016 | Mashiach | G06F 16/9535 |
| 2016/0307101 A1 | 10/2016 | Zhang et al. | |
| 2016/0328739 A1* | 11/2016 | Synett | G06Q 30/0245 |
| 2016/0359993 A1* | 12/2016 | Hendrickson | G06F 16/951 |
| 2016/0378776 A1 | 12/2016 | Green et al. | |
| 2017/0046374 A1 | 2/2017 | Fletcher et al. | |
| 2017/0185592 A1 | 6/2017 | Frei et al. | |
| 2017/0230320 A1 | 8/2017 | Knight et al. | |
| 2017/0279831 A1* | 9/2017 | Di Pietro | H04L 43/0894 |
| 2017/0339093 A1 | 11/2017 | Pesavento et al. | |
| 2017/0361158 A1* | 12/2017 | Ahuja | G06Q 10/06393 |
| 2018/0025389 A1 | 1/2018 | Arora et al. | |
| 2018/0095965 A1* | 4/2018 | DeLuca | G06F 16/9535 |
| 2018/0124129 A1* | 5/2018 | Geisler | H04L 67/06 |
| 2018/0150874 A1* | 5/2018 | Chen | G06N 20/20 |
| 2018/0157381 A1 | 6/2018 | Jung et al. | |
| 2018/0157468 A1 | 6/2018 | Stachura | |
| 2018/0174172 A1 | 6/2018 | Hughes et al. | |
| 2018/0205676 A1* | 7/2018 | Goyal | H04L 51/04 |
| 2018/0287982 A1 | 10/2018 | Draeger et al. | |
| 2019/0104192 A1* | 4/2019 | Lonij | G06Q 50/01 |
| 2020/0037118 A1 | 1/2020 | Delanghe et al. | |
| 2020/0272849 A1 | 8/2020 | Tomoda | |
| 2020/0366739 A1 | 11/2020 | Bao | |
| 2021/0385099 A1 | 12/2021 | Delanghe et al. | |
| 2022/0408225 A1 | 12/2022 | DeLanghe | |

OTHER PUBLICATIONS

Office Action for U.S. Appl. No. 16/526,666, mailed on Jan. 26, 2021, DeLanghe, "Method, Apparatus, and Computer Program Product for Organizational Telemetry Discovery Within a Group Based Communication System", 29 pages.

Non-Final Office Action mailed Mar. 24, 2023 for related U.S. Appl. No. 17/407,891, entitled "User Account Telemetry Within a Communication Platform" (23 pages).

Final Office Action mailed Jul. 5, 2023 for related U.S. Appl. No. 17/407,891, entitled "User Account Telemetry Within a Communication Platform" (22 pages).

"Die, Email, Die! A Flickr Cofounder Aims to Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

(56) References Cited

OTHER PUBLICATIONS

U.S. Appl. No. 15/604,584, filed May 24, 2017, In re: Grant et al. entitled Messaging Search and Management Apparatuses, Methods and Systems, 139 pages.
U.S. Appl. No. 15/604,589, filed May 24, 2017, In re: Grant et al. entitled Messaging Search and Management Apparatuses, Methods and Systems, 139 pages.
U.S. Appl. No. 16/526,666, filed Jul. 30, 2019, In re: DeLanghe et al. entitled Method, Apparatus, and Computer Program Product for Organizational Telemetry Discovery Within a Group Based Communication System, 103 pages.
Office Action for U.S. Appl. No. 16/526,759, mailed on Jan. 14, 2021, DeLanghe, "Method, Apparatus, and Computer Program Product for Individual Profile Telemetry Discovery Within a Group Based Communication System", 20 pages.
Office Action for U.S. Appl. No. 16/526,666, mailed on Jul. 9, 2021, DeLanghe, "Method, Apparatus, and Computer Program Product for Organizational Telemetry Discovery Within a Group Based Communication System", 30 Pages.
Office Action for U.S. Appl. No. 17/407,891, mailed on Dec. 9, 2022, Delanghe, "User Account Telemetry Within a Communication Platform", 20 pages.

\* cited by examiner

300

301 — For each user identifier of a plurality of user identifiers of a group-based communication system and based on a group-based communication data corpus, generate an attention score vector comprising a plurality of attention scores. In embodiments, each attention score is associated with a unique other user identifier of the plurality of user identifiers

302A — For each user identifier, calculate a user priority score associated with the unique other user identifier

302B — Normalize the user priority score relative to other user priority scores according to a possible attention percentage

303 — Transmit for rendering an attention score interface comprising an attention score visual representation based in part on one or more attention score vectors

304A — For each attention score vector record of the plurality of attention score vectors, generate a group-based communication attention score divergence measure based at least in part on a predicted short term attention score and an actual short term attention score

304B — Assign an attention score rank value to the attention score vector record based at least in part on the attention score occurrence divergence measure

304C — Arrange in an ordered attention score vector record list each of the attention score vector records in an order according to their attention score vector record rank values

305 — Transmit an attention score trend interface for rendering by the display device of the requesting client device, wherein the attention score trend interface is generated based in part on the ordered attention score vector record list

FIG. 3A

Trending this week across all departments in TACME Corp.

Topics — See all

Dogfood
35 people in 18 channels

Emoji 5
35 people in 18 channels

Peer feedback
35 people in 18 channels

Links & Files — See all

| Sedslist ad | Autocomplete review | New hires |

Channels — See all triage-core
- User name — message message message here is a message message message
- User name — message message message here is a message message message visible-results
- User name — message message message here is a message message message
- User name — message message message here is a message message message company-culture
- User name — message message message here is a message message message
- User name — message message message here is a message message message

FIG. 5A

TACME Corp. Trends

⊠ Get Email Updates

Insights

Trending February 11th-16th in design across all workspaces.

🔍 Trending Topics
Topics discussed the most this week in public channels

1. dogfood
   ↑ 82% 169 mentions this week.

2. emoji
   ↑ 25% 346 mentions this week.

3. peer reviews >
   ↑ 60% 300 mentions this week.

4. mario
   ↑ 124% 76 mentions this week.

5. reviews
   ↑ 62% 111 mentions this week.

🔍 Show more

🔗 Trending Links & Files
Most popular links and files shared in popular channels

| 👁 57 opens of 570 views | 👁 120 opens of 422 views | 👁 67 clicks of 270 views |
|---|---|---|
| 🦆 Quacker | 📄 Dropbox Paper | Trootle Slides Presentation |
| JaneDoe @JaneDoe | Rebranding the Highlights Tears | Q1 2018 PDE All Hands (Master) |
| Important note to all Execs of companies who use Plack: My ? discovered a serious security al... | We need a ? Principles are inclusive of a good name and the team's mission. | |
| Shared in #feat-file-treads  View in Plack > | Shared in #team-sli +2 more  View in Plack > | Shared in #pde-announce  View in Plack > |

🌐 Trending Channels
Public channels trending week over week

1. x design-team  ↑ 2.8x
   👥 154 members | Most Active: Engineering, Design, Product Management  ●●●●○

2. x minifeat-offlineput  ↑ 34x
   👥 11 members | Most Active: Engineering, Design  ●●●●○

3. x design-crit-core  ↑ 5.0x
   👥 19 members | Most Active: Design, Product Management  ●●●○○

4. x help-workplace-sf500  ↑ 7.5x
   👥 122 members | Most Active: Design, Product Management  ●●●○○

5. x core-feedback  ↑ 3.5x
   👥 158 members | Most Active: Engineering, Design, Product Management  ●●○○○

🔍 Show more

🏃
That's the 3,000 foot view.

Insights
< Topics

[Get Email Updates]

peer reviews

Trending February 7th-12th in Design across all workspaces.

Popularity Over Time
Here's a short description of how we determine sentiment.

Graph Display: [All time ▽]

[Line graph showing values from Jan 15 to Feb 12, ranging 0 to 6k, with a peak near Feb 10]

Related Topics
Topics often discussed alongside peer reviews.

| kanjoya |
| ↑ 60% 100 mentions this week |

| manager feedback |
| ↑ 60% 100 mentions this week |

| promotions |
| ↑ 60% 100 mentions this week |

Relevant Channels
Channels peer reviews was mentioned most in.

| # design team | ↑ 3.5x |
| 360 members | |

| # product writing | ↑ 0.6x |
| 26 members | |

| # brand-design | ↓ 1.2x |
| 44 members | |

Message Highlights
Highlights is week mentioning peer reviews.

February 11th

Craig Doe 4:05PM
🔥 This Week in Design:
Esteemed colleagues - our weekly update!

▶ Announcements

◦ Certainly you can't have avoided hearing that it's time for our performance review cycle! If you haven't finished your peer, self, manager reviews yet, please do so immediately; oh god you're so late, hurry.

◦ Looking for Enterprise and Platform? We've moved to offices, where we're enjoying fully transparent windows, abundant meeting rooms, and FLAMIN' HOT Cheetos. Come visit!

◦ Like money? Submit your expenses Today/Tonight to get reimbursed for anything from FY2018.

February 9th

Jane Doe 4:05PM
Loving this search prototype @Jane! I have to say, I'm certain this is the best design I've ever seen in my entire life. Great work. Look forward to an excellent peer review.

FIG. 5D

🔗 Trending Links & Files
Most popular links and files shared in public channels.

---

| 👁 87 opens of 570 views | 👁 120 opens of 422 views | 👁 87 clicks of 370 views |
|---|---|---|
| 🐦 Quacker | ● CropRox Paper | Trooble Slides Presentation |
| Jane Doe @JaneDoe | Tacme Design Guidelines | Design All Hands |
| Acme Corp. has one of the most delightful user experiences I've ever seen . Such an easy thing to... | Welcome to the Tacme Design Guidelines Document. Here we'll talk a bit about when to use... |  |
| https://twitter.com/users/allisonbass/erwer-091232145 | https://paper.croprox.com/doc/Acme-Design-Guidelines-WphM5JL4amh5E... | https://drive.trooble.com/slides/design-all-hands.WphM5JL4amh5E... |
| Shared in #feat-file threads View in slack | Shared in #team-qua +2 more View in slack | Shared in #pdc-announce View in slack |

⊕ Trending Channels
Public channels trending week over week.

---

1   # design-team      ↑ 2.8x
158 members  |  Most Active: Engineering, Design, Product Management

---

2   # feature-search      ↑ 34x
11 members  |  Most Active: Engineering, Design

---

3   # design-feedback      ↑ 34x
19 members  |  Most Active: Design, Product Management

---

4   # design-gudelines      ↑ 7.5x
133 members  |  Most Active: Design, Product Management

---

5   # product-design      ↑ 3.5x
158 members  |  Most Active> Engineering, Design, Product Management

---

⊙ Show more

That's the 3,000 foot view.

METHOD, APPARATUS, AND COMPUTER PROGRAM PRODUCT FOR ORGANIZATIONAL TELEMETRY DISCOVERY WITHIN A GROUP BASED COMMUNICATION SYSTEM

CROSS REFERENCE TO RELATED APPLICATIONS

The present application is a continuation in part of U.S. patent application Ser. No. 16/526,666, titled "METHOD, APPARATUS, AND COMPUTER PROGRAM PRODUCT FOR ORGANIZATIONAL TELEMETRY DISCOVERY WITHIN A GROUP BASED COMMUNICATION SYSTEM," filed Jul. 30, 2019, which claims priority to U.S. Application Ser. No. 62/712,047, titled "METHOD, APPARATUS, AND COMPUTER PROGRAM PRODUCT FOR ORGANIZATIONAL TELEMETRY DISCOVERY WITHIN A GROUP BASED COMMUNICATION SYSTEM," filed Jul. 30, 2018, the contents of which are incorporated herein by reference in their entirety.

The present application is related to co-pending U.S. application Ser. No. 16/526,759, titled "METHOD, APPARATUS, AND COMPUTER PROGRAM PRODUCT FOR INDIVIDUAL PROFILE TELEMETRY DISCOVERY WITHIN A GROUP BASED COMMUNICATION SYSTEM," filed Jul. 30, 2019, which claims priority to U.S. Application Ser. No. 62/712,013, titled "METHOD, APPARATUS, AND COMPUTER PROGRAM PRODUCT FOR INDIVIDUAL PROFILE TELEMETRY DISCOVERY WITHIN A GROUP-BASED COMMUNICATION SYSTEM," filed Jul. 30, 2018, the contents of which are incorporated herein by reference in their entirety.

BACKGROUND

An organization may support communication and collaboration among users across the organization. Applicant has identified a number of deficiencies and problems associated with assessing usage, impact, and value of an organization communication system. Through applied effort, ingenuity, and innovation, many of these identified problems have been solved by developing solutions that are included in embodiments of the present disclosure, many examples of which are described in detail herein.

BRIEF SUMMARY

This specification relates to the discovery and electronic presentation of organizational telemetry data within a group-based communication system.

In embodiments, an apparatus comprises at least one processor and at least one memory storing computer code that, when executed by the at least one processor, causes the apparatus to generate an interaction signal trends interface according to functions described herein.

In embodiments, the apparatus is configured to, for each interaction signal of a plurality of interaction signals, extract interaction signal metadata into an interaction signal data structure of a plurality of interaction signal data structures, wherein the interaction signal metadata comprises an interaction source type, an interaction source identifier, and an interaction type.

In embodiments, the apparatus is further configured to, for each interaction signal data structure record of the plurality of interaction signal data structures comprising an interaction source identifier associated with a first universal record locator (URL) identifier, generate an interaction signal occurrence divergence measure based at least in part on a predicted short term interaction signal occurrence tally and an actual short term interaction signal occurrence tally, and assign an interaction signal data structure record rank value to the interaction signal data structure record based at least in part on the interaction signal occurrence divergence measure.

In embodiments, the apparatus is further configured to arrange in an ordered interaction signal data structures list each of the interaction signal data structures in an order according to their interaction signal data structure record rank values.

In embodiments, the apparatus is further configured to transmit an interaction signal trends interface for rendering within a display device of a requesting client device, wherein the interaction signal trends interface is generated based in part on the ordered interaction signal data structure records list.

In embodiments, a second interaction signal data structure record of an interaction signal data structure associated with the first universal record locator (URL) identifier comprises an interaction type representative of one or more of a selection or a share.

In embodiments, the predicted short term interaction signal occurrence tally based at least part on a long term interaction signal occurrence tally, and wherein the predicted short term interaction signal occurrence tally is representative of a programmatically generated expected number of times an interaction signal associated with the first universal record locator (URL) identifier will occur over a second network time period.

In embodiments, the plurality of interaction signals is received from a plurality of client devices, and wherein each client device is associated with a unique user identifier within a group-based communication system.

In embodiments, the long term interaction signal occurrence tally is representative of a number of times an interaction signal associated with the interaction signal data structure has occurred over a first network time period, and wherein the long term interaction signal occurrence tally is based on long term interaction signal data retrieved from a group-based communication repository.

In embodiments, the actual short term interaction signal occurrence tally is representative of a number of times an interaction signal associated with the interaction signal data structure occurred over the second network time period, and wherein the short term interaction signal occurrence tally is based on short term interaction signal data retrieved from a group-based communication repository.

In embodiments, the interaction signal metadata further comprises one or more of a user identifier, an organization identifier, a team identifier, or a timestamp.

In embodiments, the universal record locator (URL) identifier is associated with universal record locator (URL) text.

In embodiments, the apparatus is further configured to parse the universal record locator (URL) text to extract strings representing words and tally each inclusion of each word across all universal record locator (URL) texts within a group-based communication system, wherein the interaction signal trends interface is generated based in part on the tally and the universal record locator (URL) text.

In embodiments, sentiment is associated with each word based on an aggregate sentiment of all universal record locator (URL) texts within which the word has been included, and wherein the interaction signal trends interface is generated based in part on one or more identified sentiments associated with the universal record locator (URL) texts.

In embodiments, the apparatus is further configured to select only those interaction signals associated with a common team identifier.

In embodiments, the apparatus is further configured to select only those interaction signals associated with a common organization identifier.

In embodiments, the apparatus is further configured to select only those interaction signals associated with a timestamp occurring within a defined network time period.

In embodiments, the apparatus is further configured to parse the universal record locator (URL) text to extract strings representing one or more of word pairs or tuples, words associated with particular topics, a group of words associated with a particular topic, or truncation of words or phrases associated with particular topics.

In embodiments, the apparatus is further configured to tally each inclusion of each string across all universal record locator (URL) texts within a group-based communication system. In embodiments, the interaction signal trends interface is generated based in part on the tally and the universal record locator (URL) text.

In embodiments, the universal record locator (URL) text comprises custom shortened universal record locator (URL) text.

In embodiments, a message comprising the universal record locator (URL) identifier is associated with message text.

In embodiments, the apparatus is further configured to parse the message text to extract strings representing words and tally each inclusion of each word across all messages comprising the universal record locator (URL) identifier within a group-based communication system. In embodiments, the interaction signal trends interface is generated based in part on the tally and the universal record locator (URL) identifier.

In embodiments, sentiment is associated with each word based on an aggregate sentiment of all message texts within which the word has been included.

In embodiments, the apparatus is further configured to parse the message text to extract strings representing one or more of word pairs or tuples, words associated with particular topics, a group of words associated with a particular topic, or truncation of words or phrases associated with particular topics.

In embodiments, the apparatus is further configured to tally each inclusion of each string across all messages comprising the universal record locator (URL) identifier within a group-based communication system. In embodiments, the interaction signal trends interface is generated based in part on the tally and the message text.

In embodiments, the apparatus is further configured to parse the universal record locator (URL) text to extract a prefix and tally each inclusion of the prefix across all messages comprising the universal record locator (URL) identifier within a group-based communication system. In embodiments, wherein the interaction signal trends interface is generated based in part on the tally and the prefix.

In embodiments, the apparatus is further configured to tally each inclusion of the prefix across only those messages comprising the universal record locator (URL) identifier that are also associated with one or more of a common team identifier, a common group identifier, or a common user identifier within the group-based communication system.

In embodiments, the apparatus is further configured to parse the custom shortened universal record locator (URL) text to extract strings representing one or more of word pairs or tuples, words associated with particular topics, a group of words associated with a particular topic, or truncation of words or phrases associated with particular topics.

In embodiments, the apparatus is further configured to tally each inclusion of each string across all custom shortened universal record locator (URL) texts within a group-based communication system. In embodiments, the interaction signal trends interface is generated based in part on the tally and the custom shortened universal record locator (URL) text.

Other embodiments include corresponding systems, methods, and computer programs, configured to perform the operations of the apparatus, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
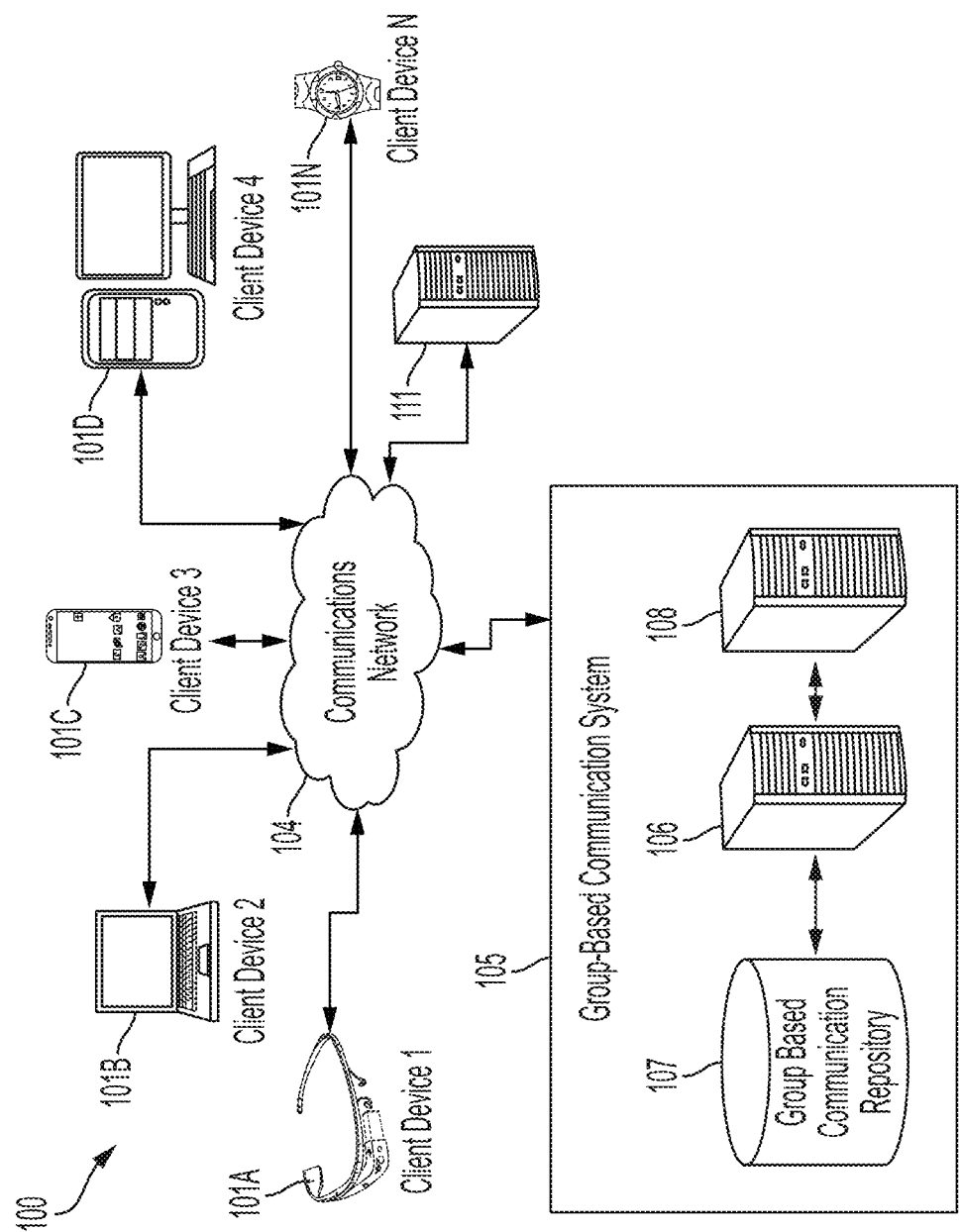
Figure 2A:
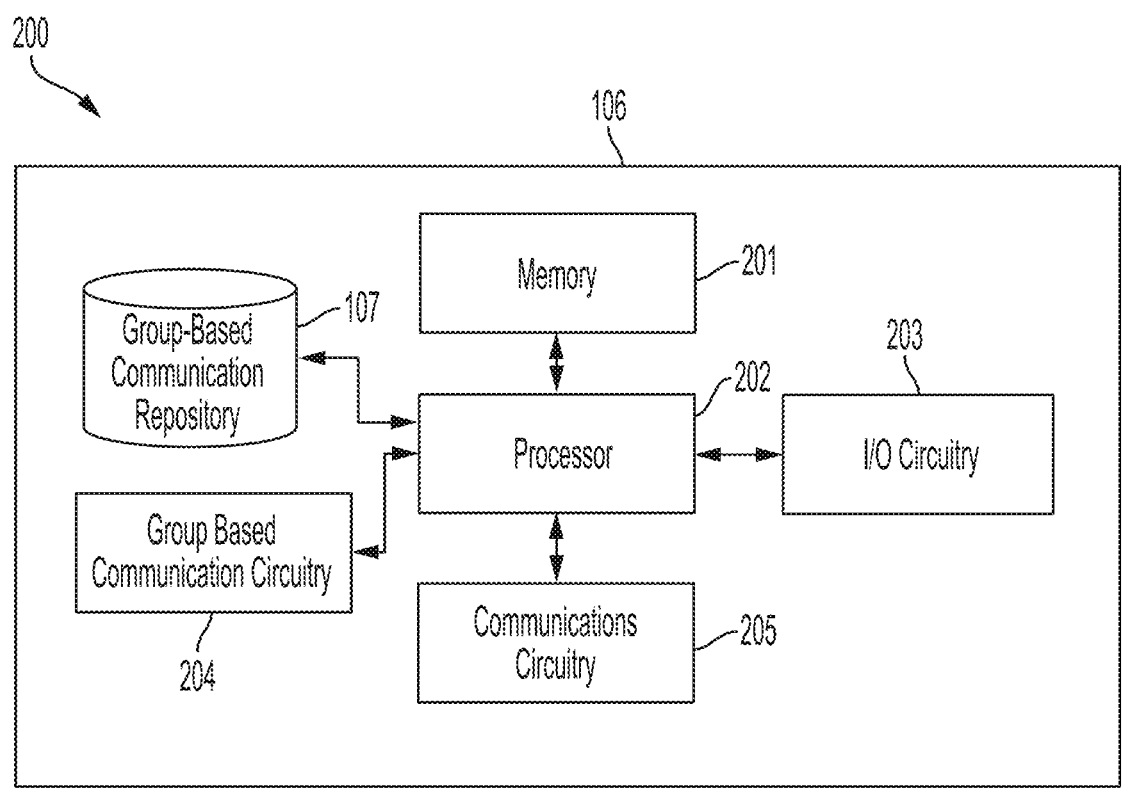
Figure 2B:
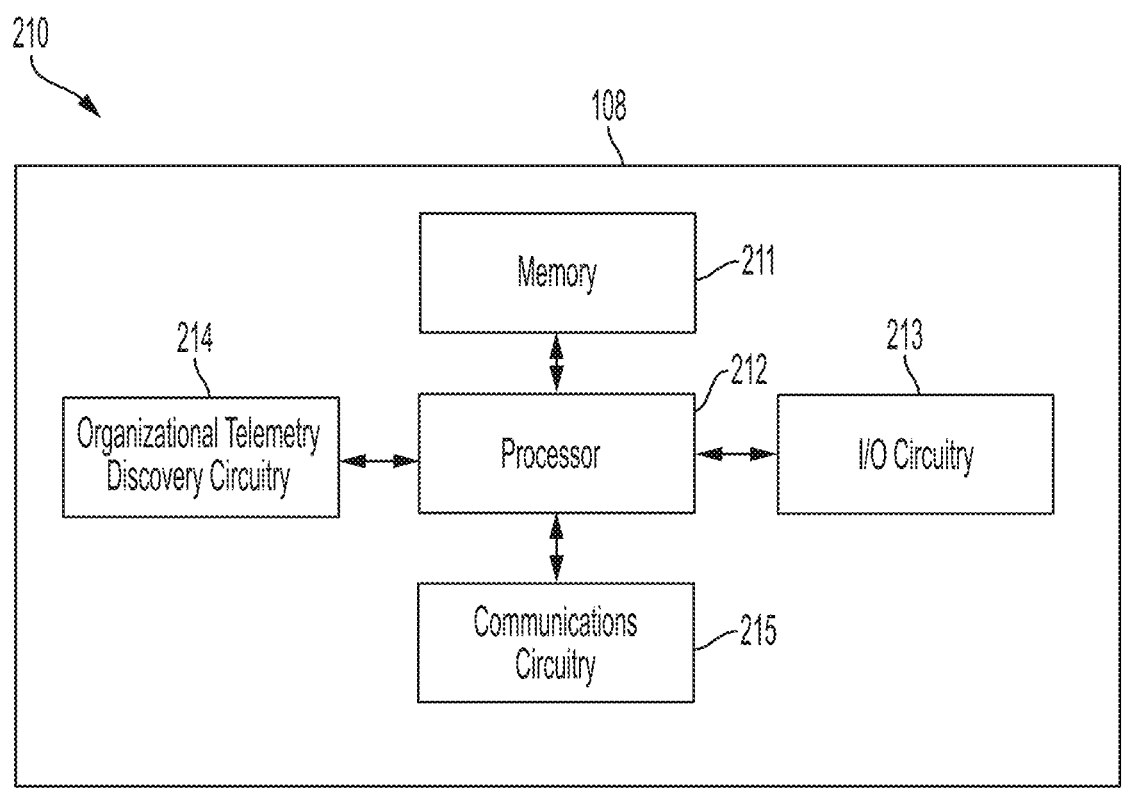
Figure 3B:
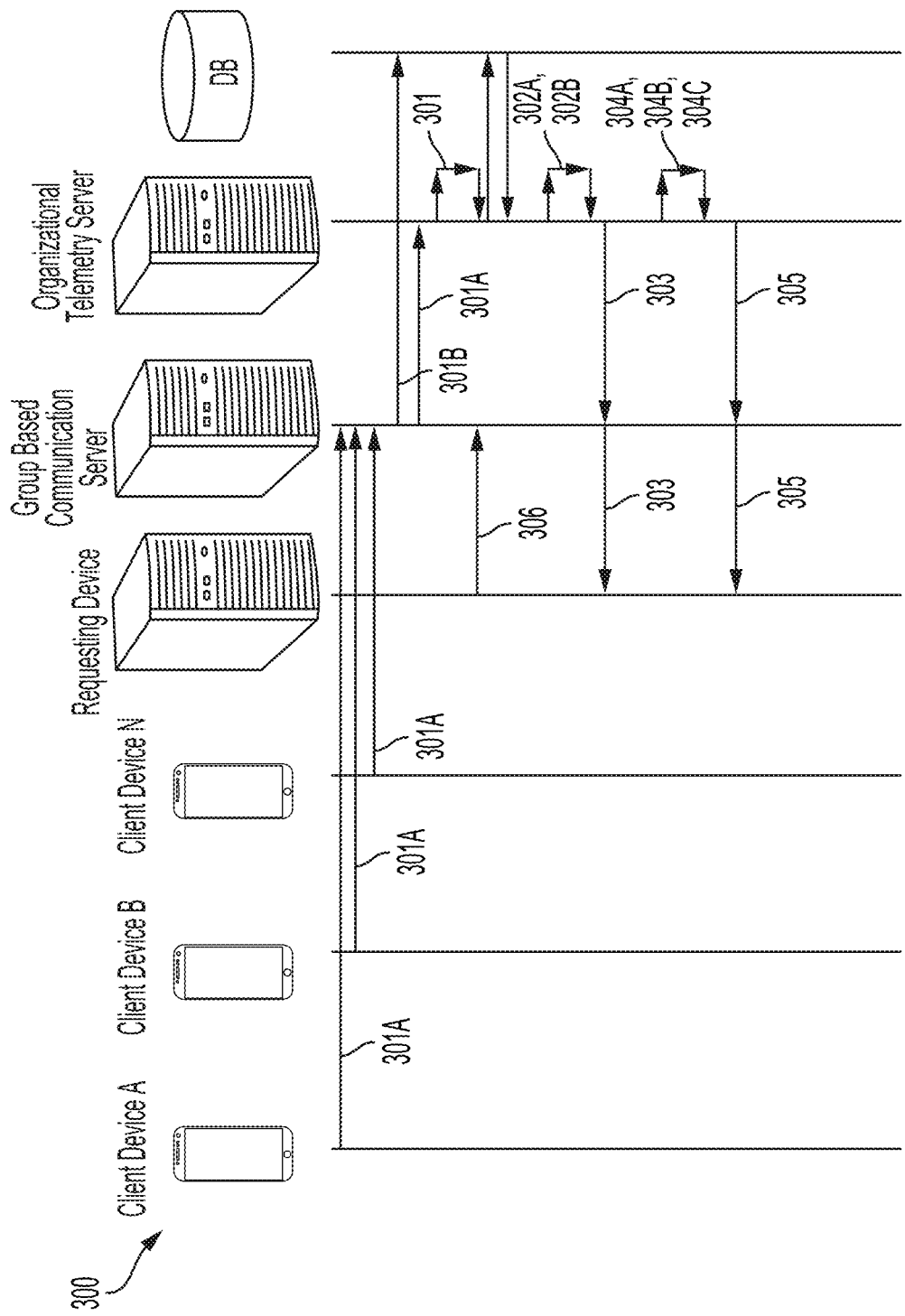
Figure 4A:
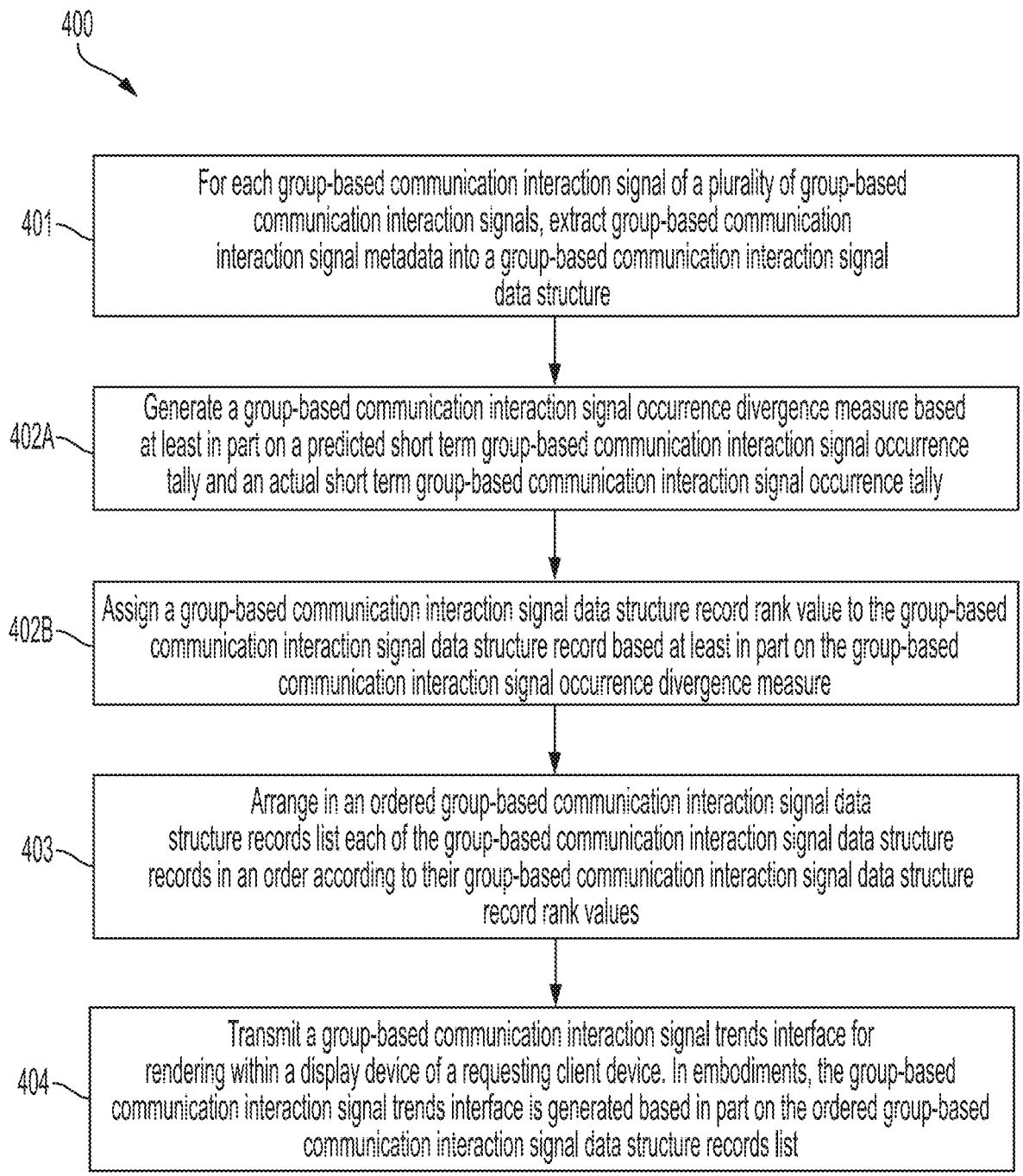
Figure 4B:
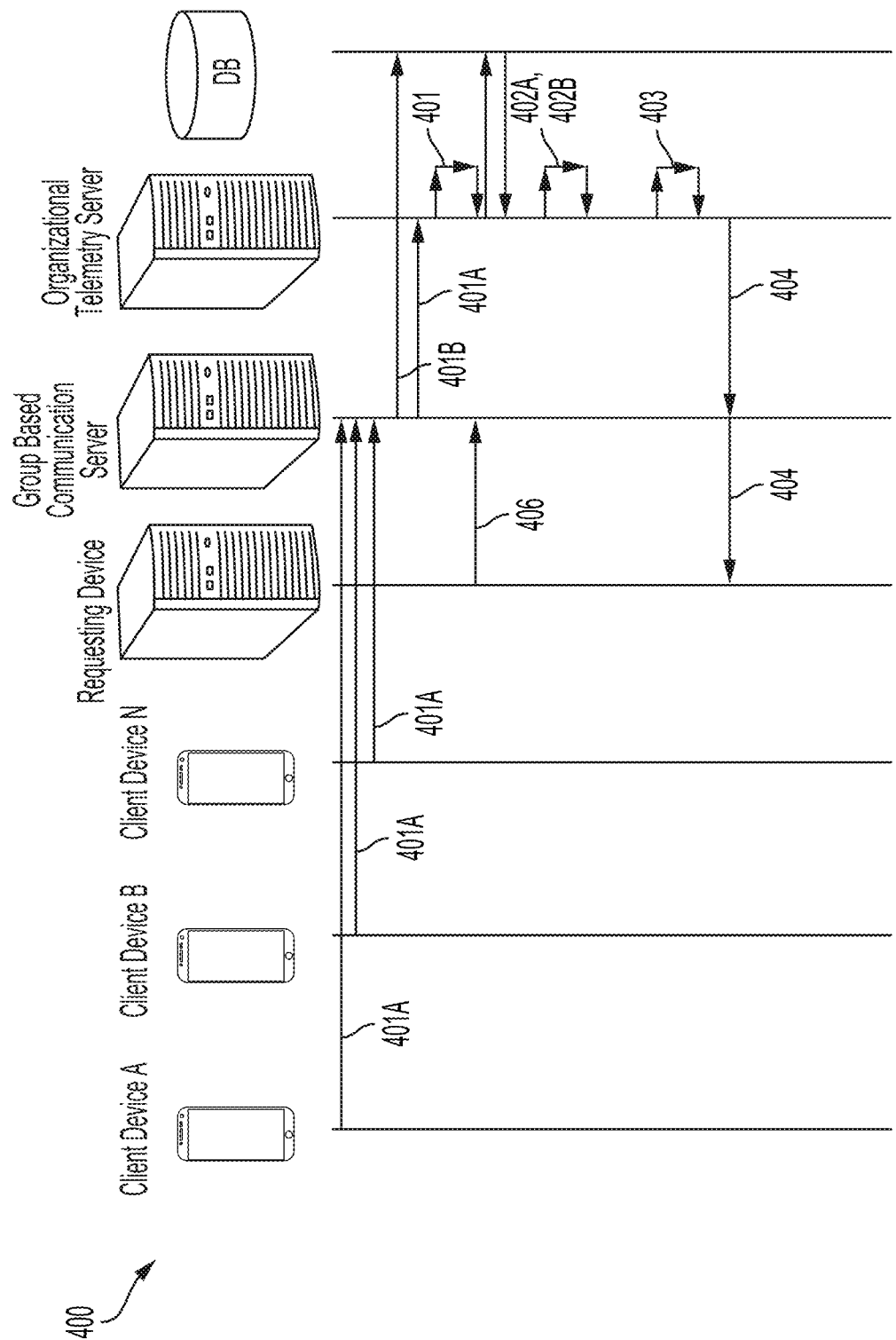
Figure 4C:
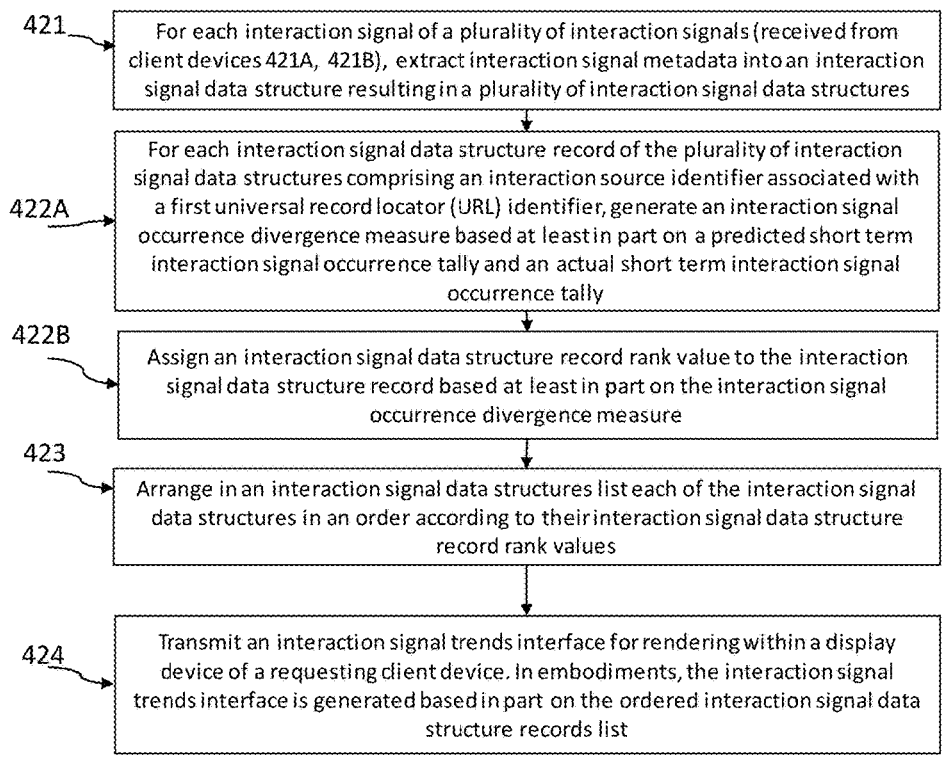
Figure 4D:
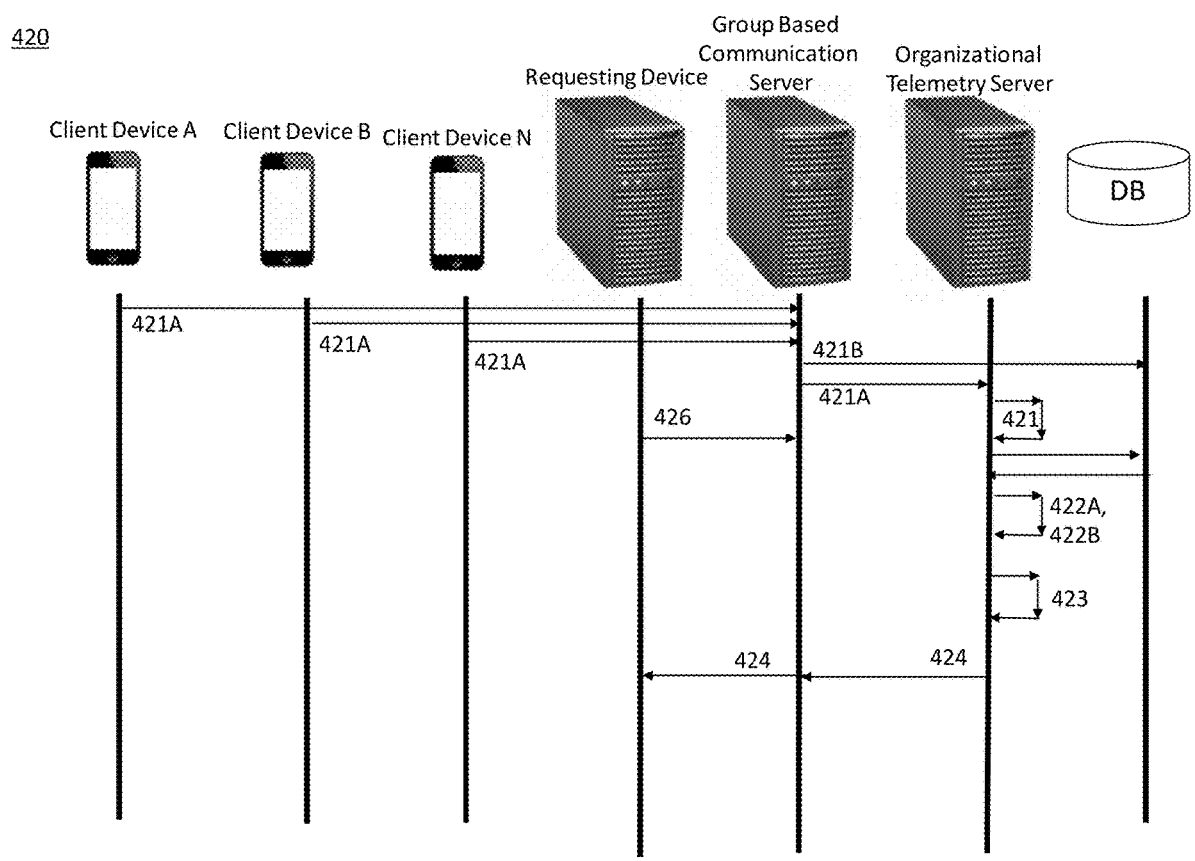
Figure 5E:
Figure 5F:
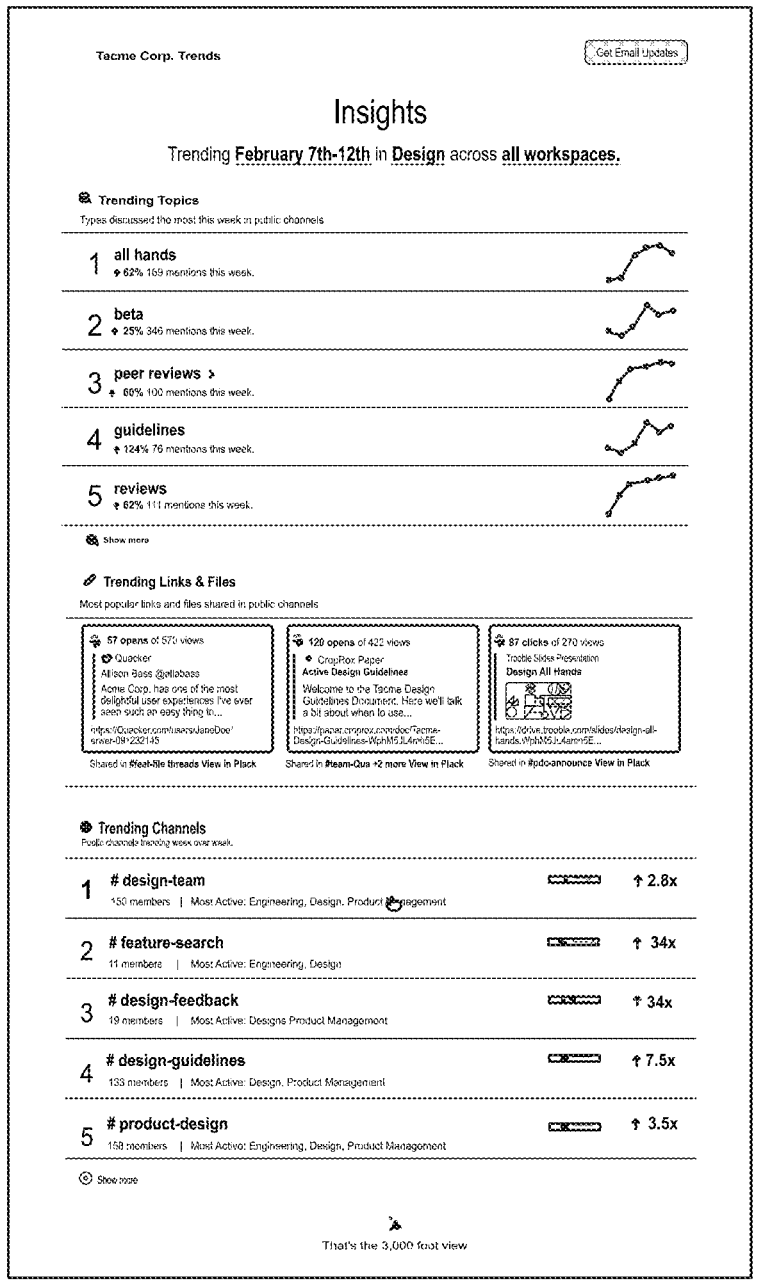
Figure 5H:
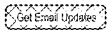
Figure 6B:
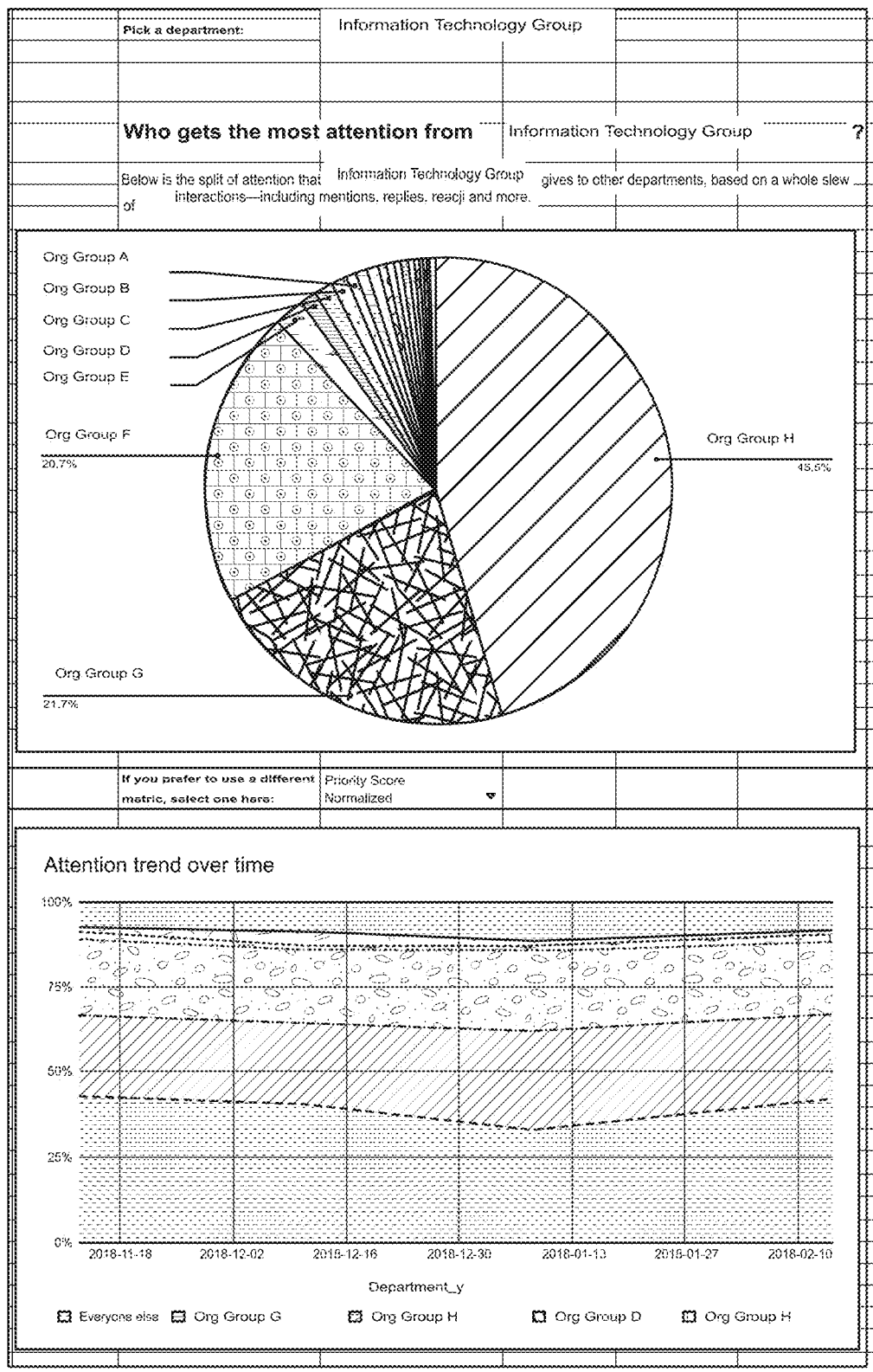
Figure 6C:
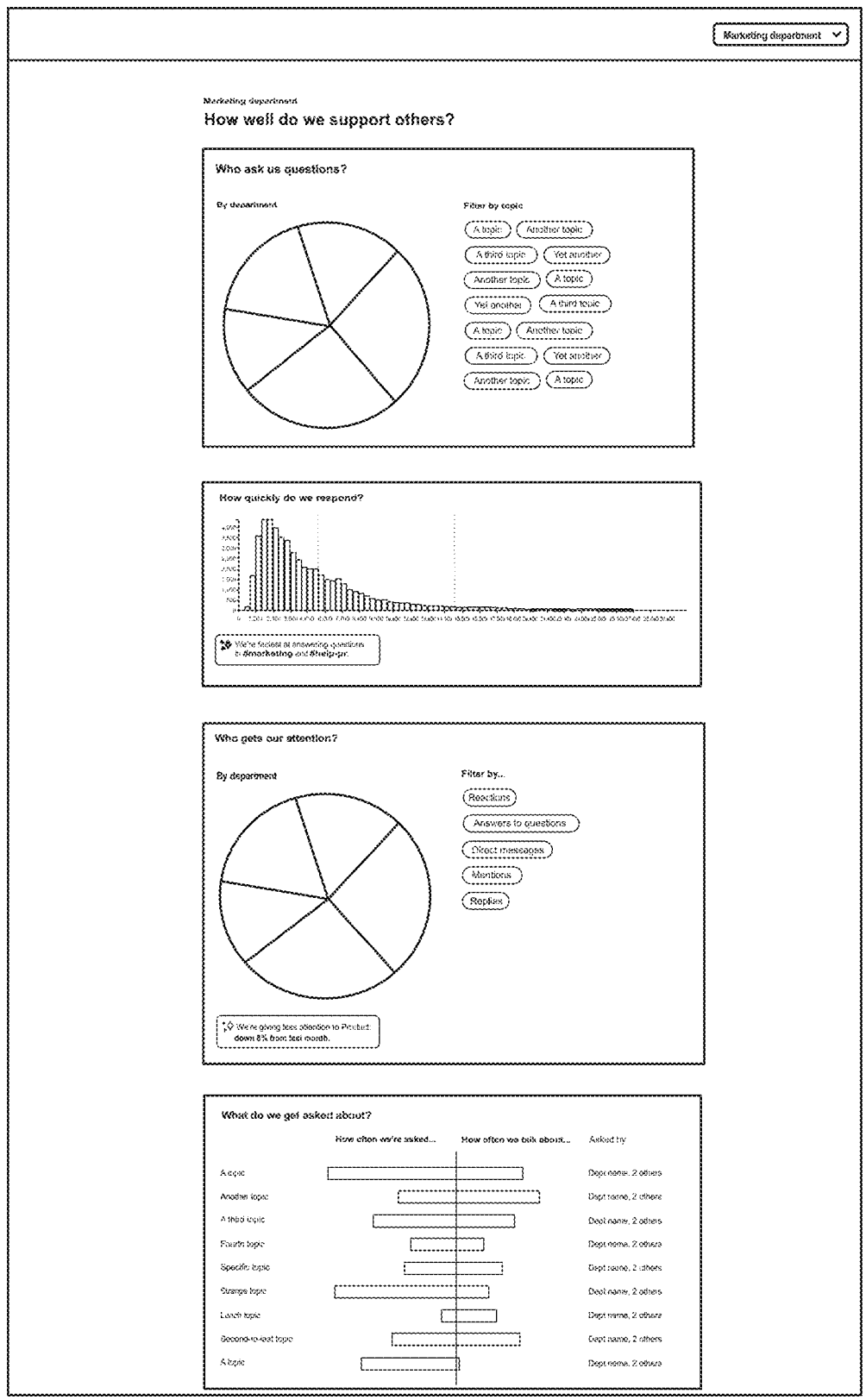
Figure 6D:
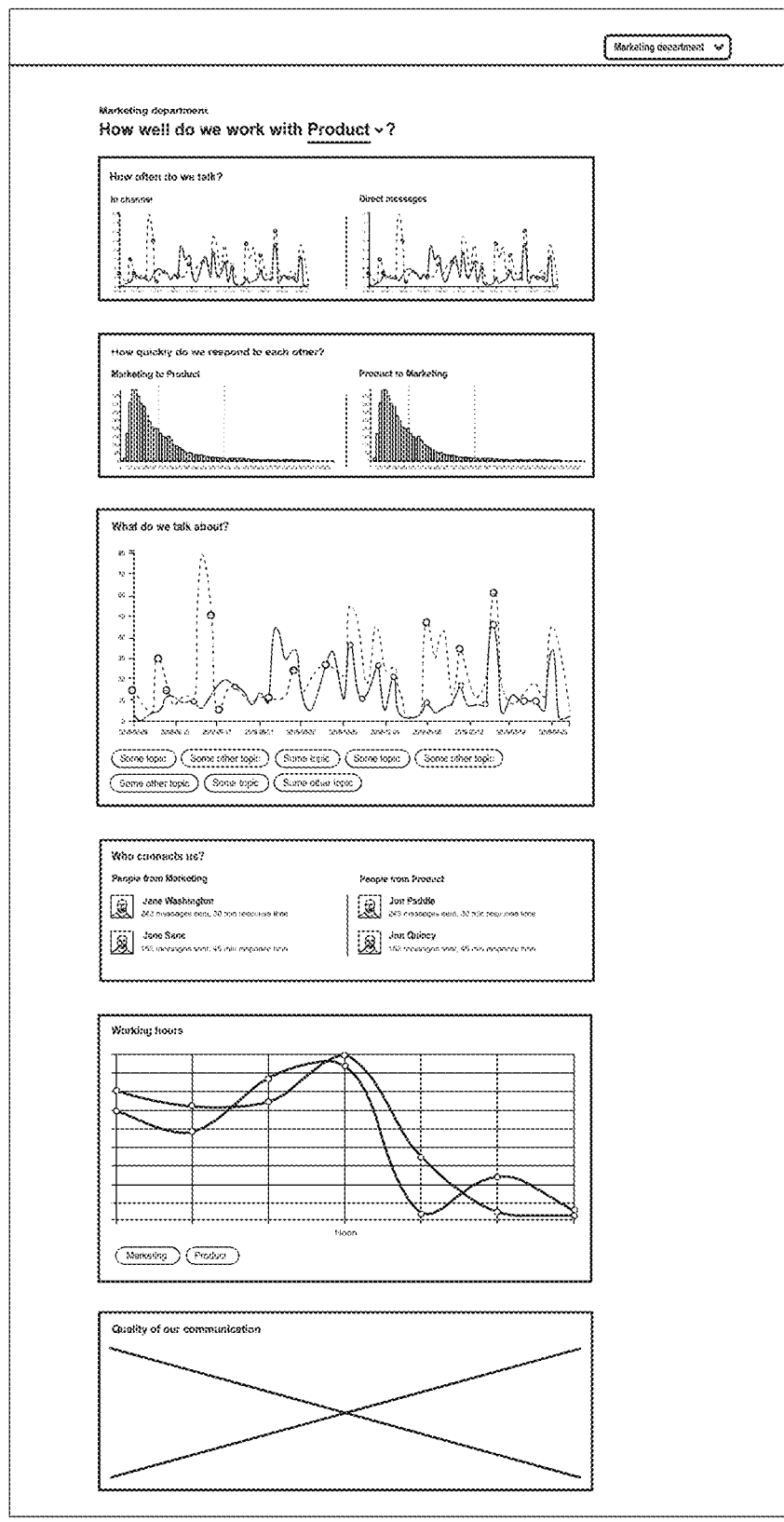
Figure 6E:
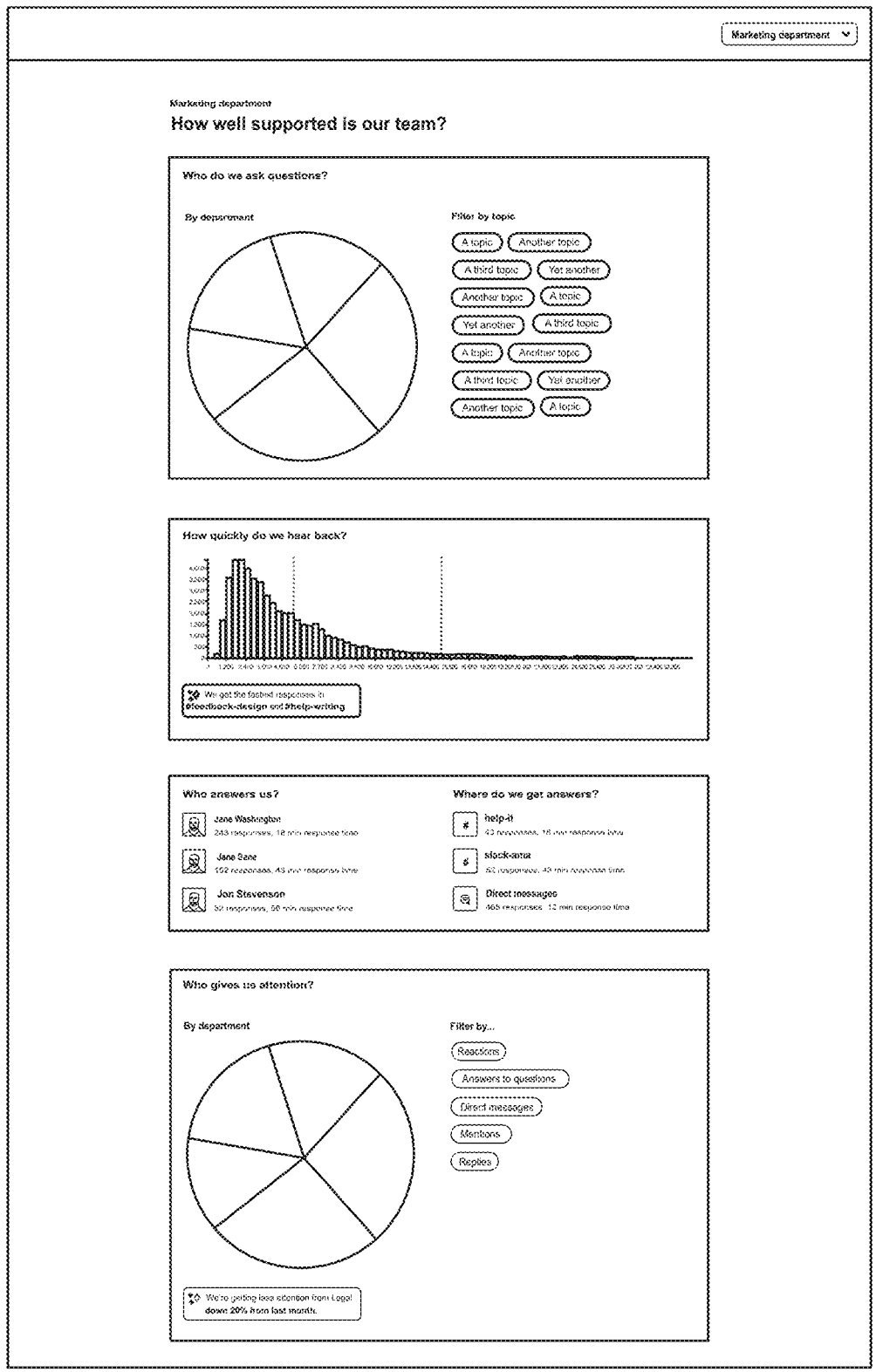
Figure 6F:
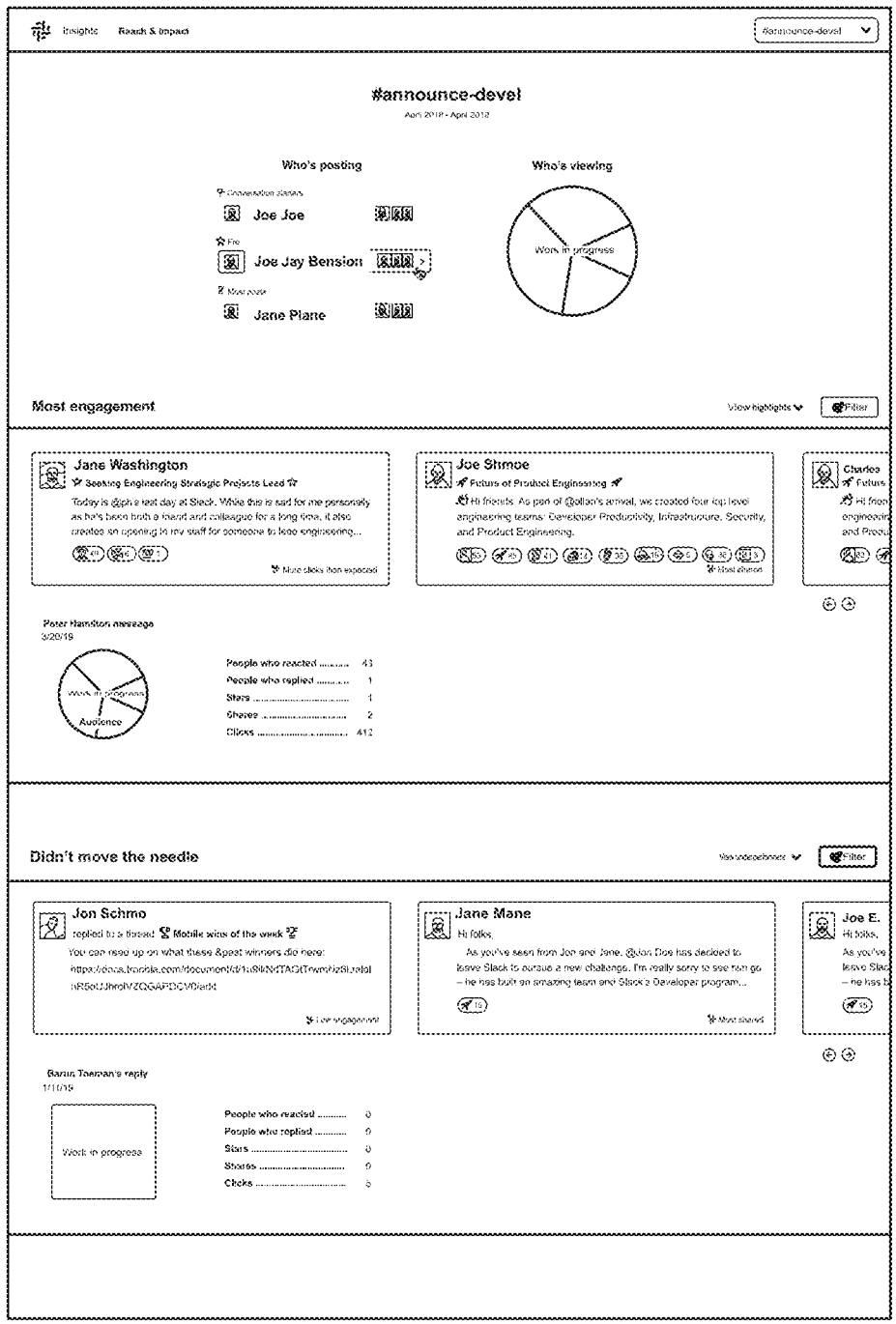
Figure 7:
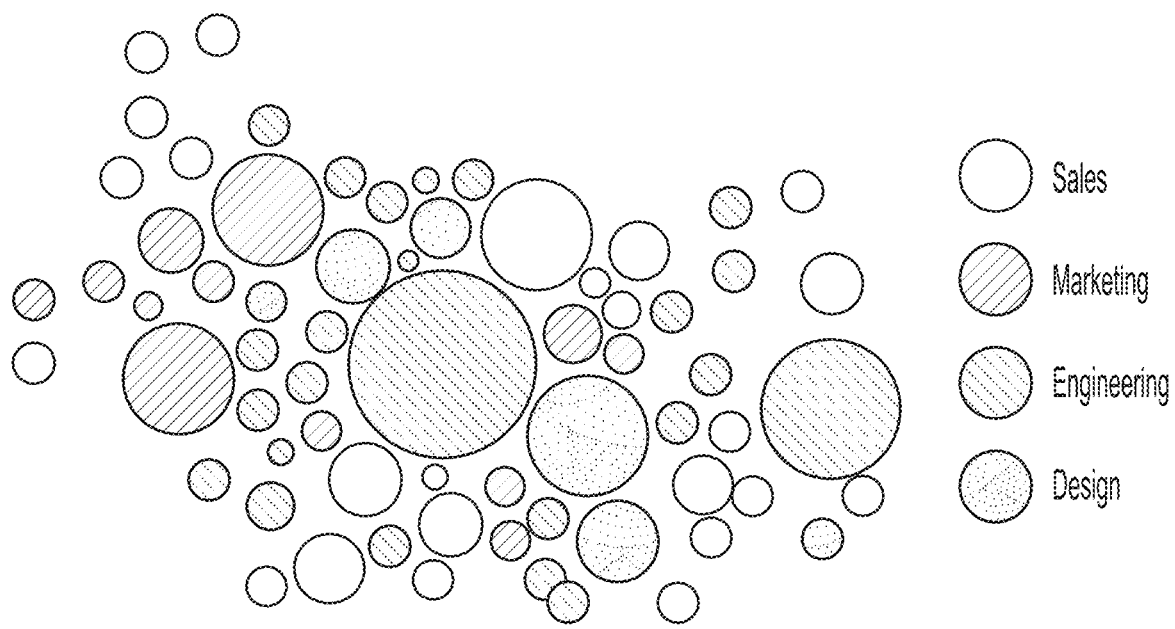
Figure 8A:
Figure 8B:
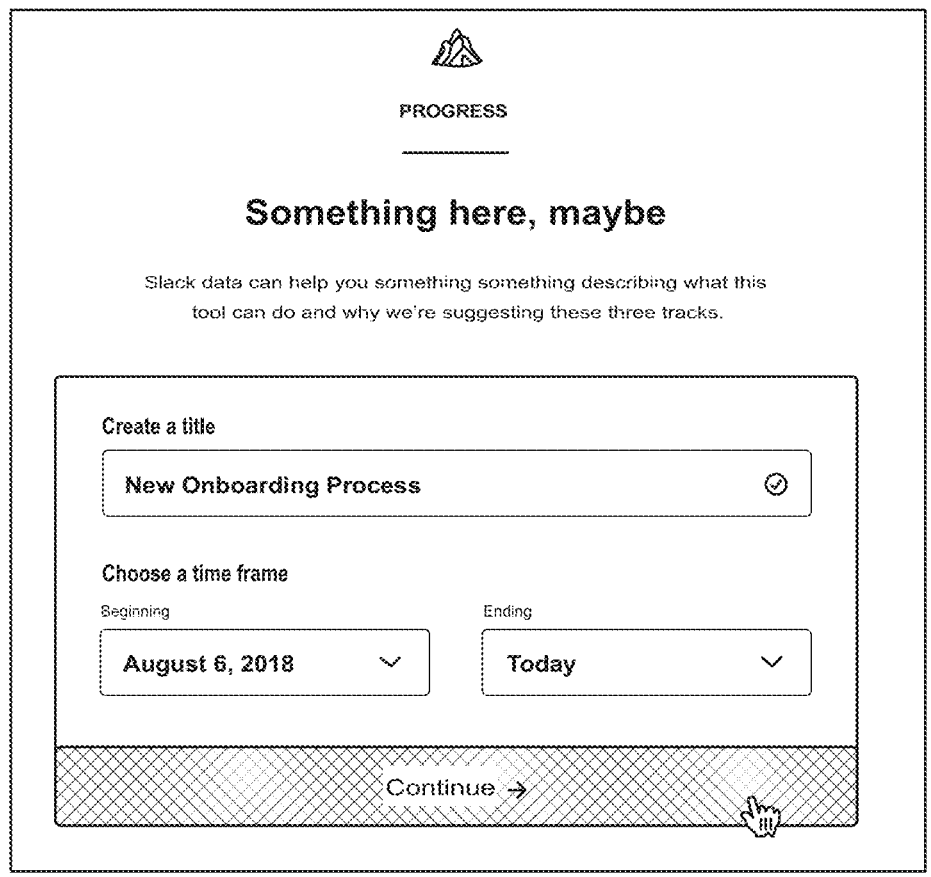
Figure 8C:
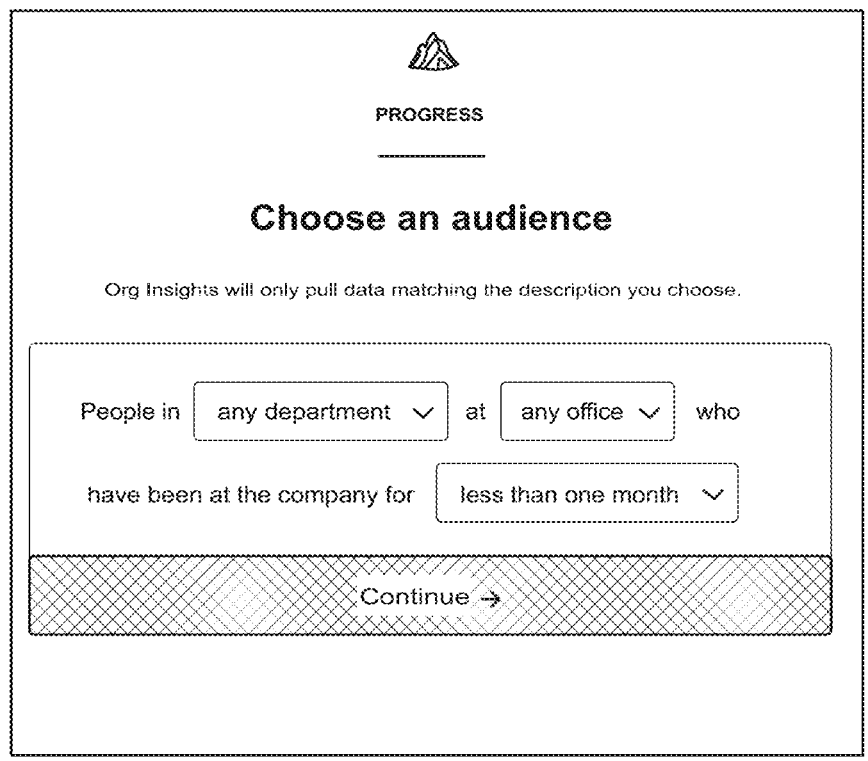
Figure 8D:
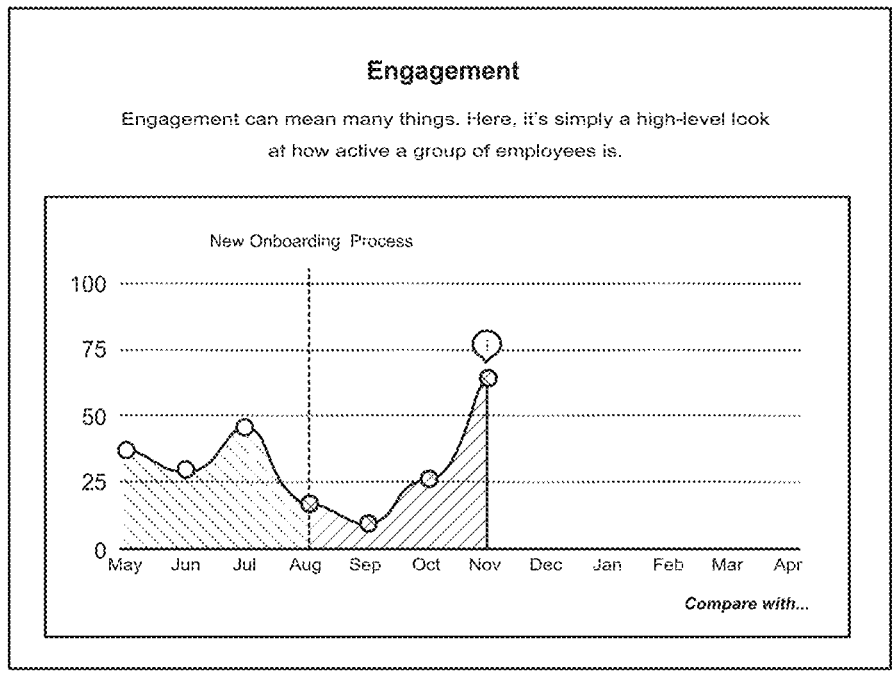
Figure 8E:
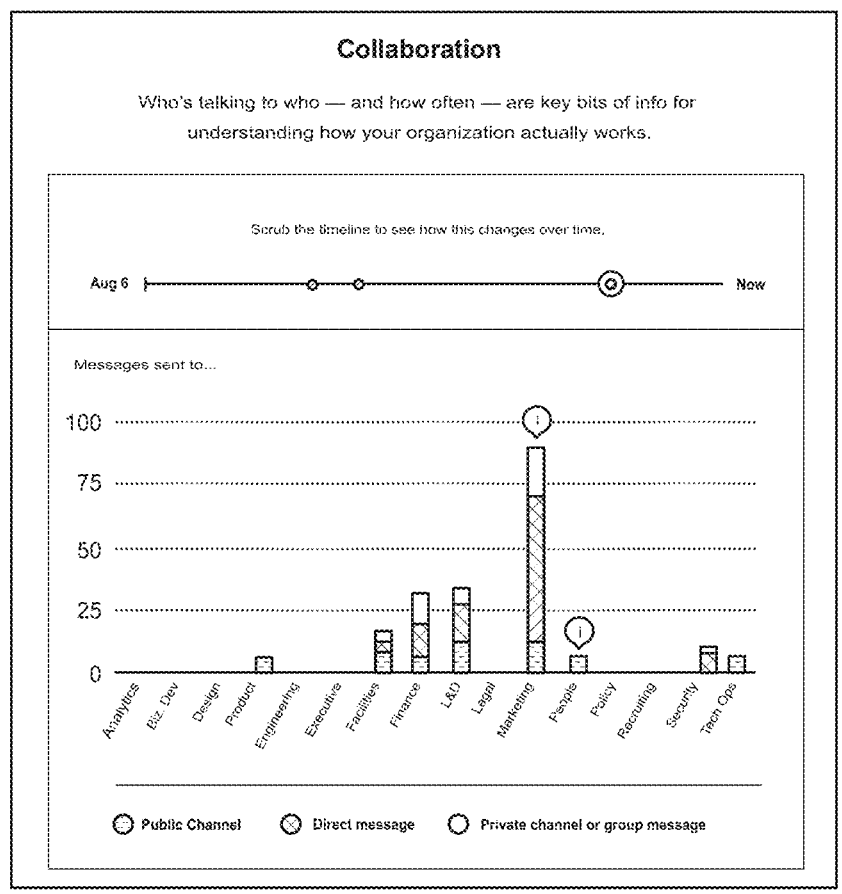
Figure 8F:
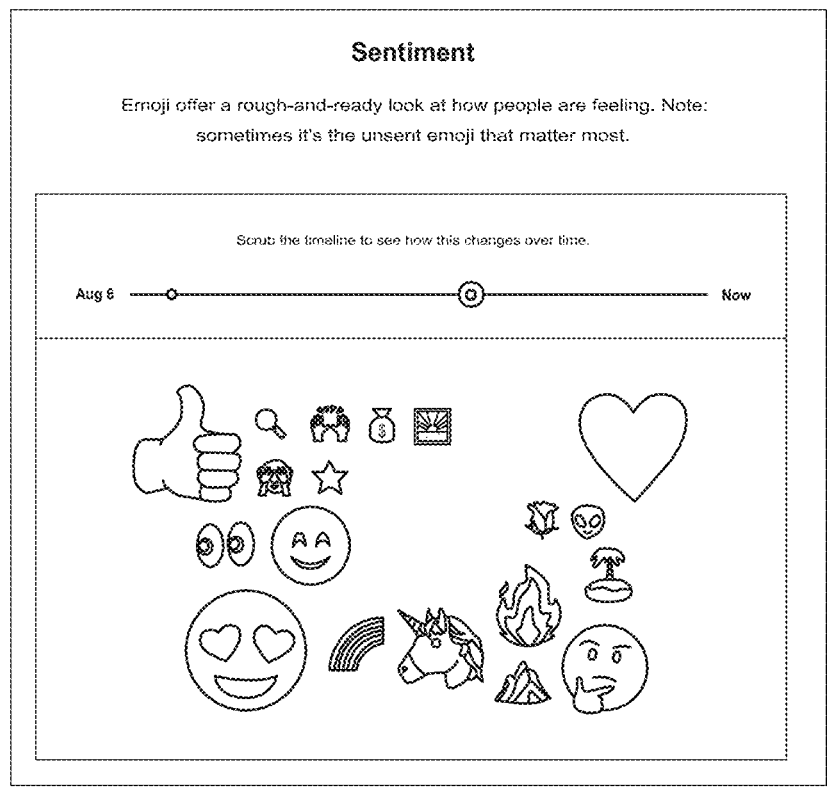
Figure 8G:
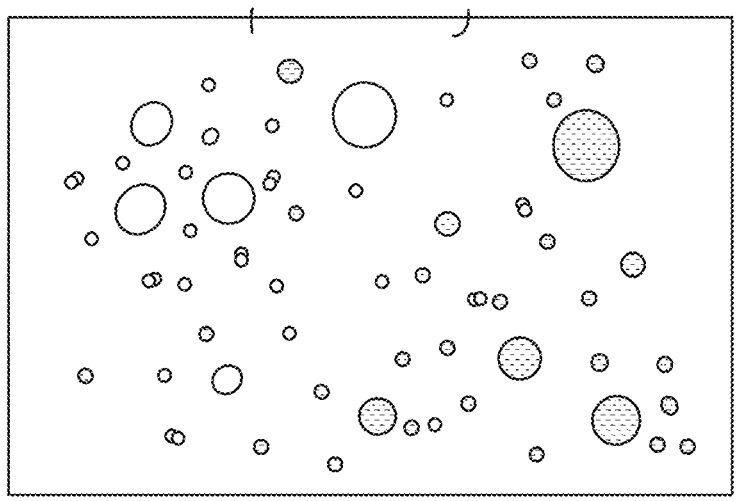
Figure 8H:
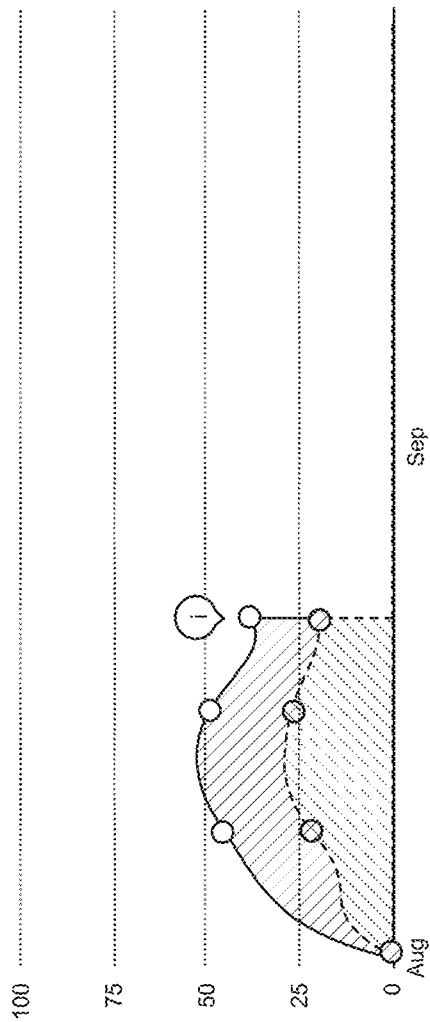

Having thus described the disclosure in general terms, reference will now be made to the accompanying drawings, which are not necessarily drawn to scale, and wherein:

FIG. 1 is a system architecture diagram of a group-based communication system configured to practice embodiments of the present disclosure;

FIG. 2A illustrates an exemplary schematic diagram of a computing entity for use with embodiments of the present disclosure;

FIG. 2B illustrates an exemplary schematic diagram of a computing entity for use with embodiments of the present disclosure;

FIG. 3A illustrates an exemplary organizational telemetry discovery process within a group-based communication analytics system for use with embodiments of the present disclosure;

FIG. 3B illustrates an exemplary organizational telemetry discovery process within a group-based communication analytics system for use with embodiments of the present disclosure;

FIG. 4A illustrates an exemplary organizational telemetry discovery process within a group-based communication analytics system for use with embodiments of the present disclosure;

FIG. 4B illustrates an exemplary organizational telemetry discovery process within a group-based communication analytics system for use with embodiments of the present disclosure;

FIG. 4C illustrates an exemplary organizational telemetry discovery process within a group-based communication analytics system for use with embodiments of the present disclosure;

FIG. 4D illustrates an exemplary organizational telemetry discovery process within a group-based communication analytics system for use with embodiments of the present disclosure;

Figure 5C:
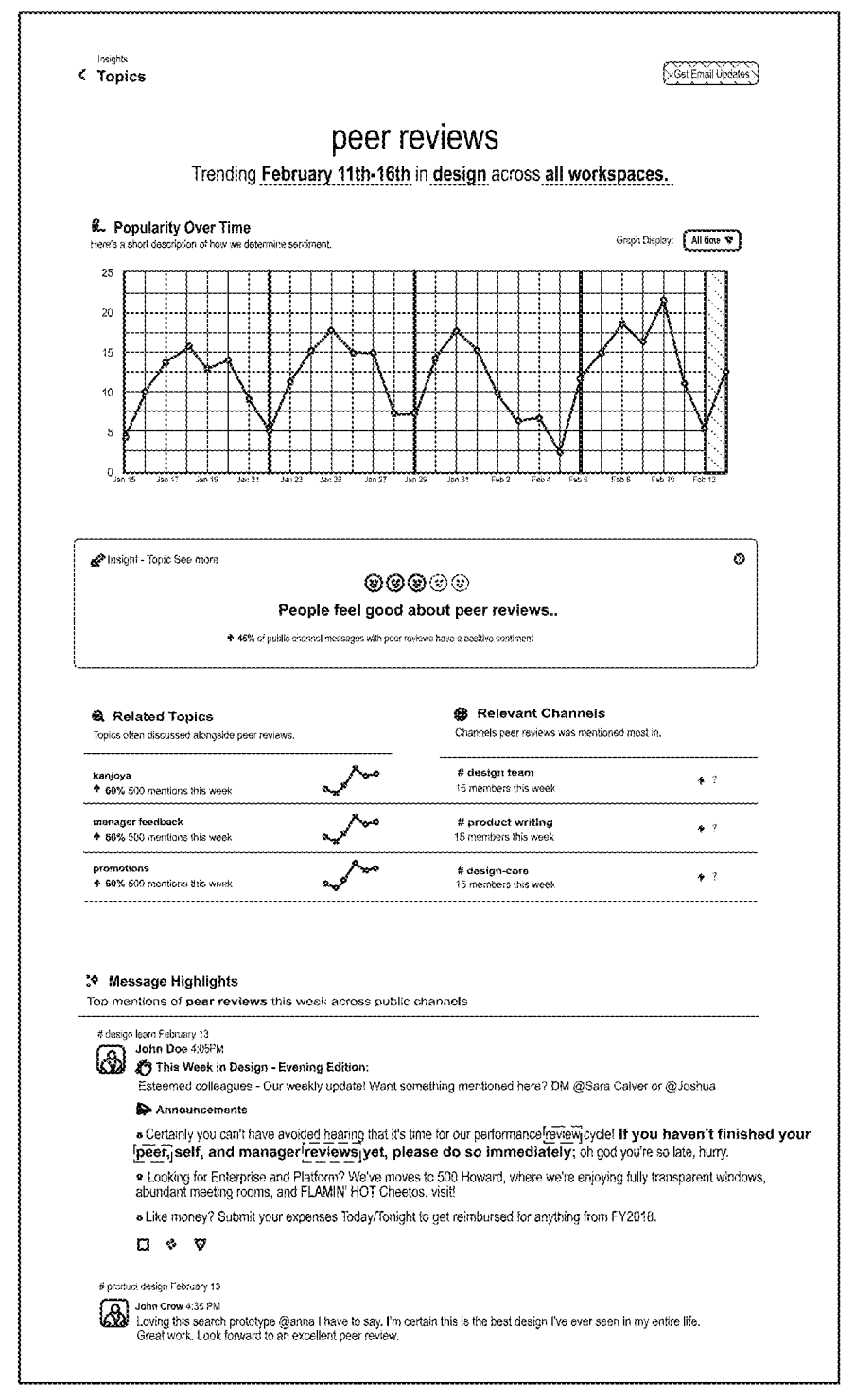

FIG. 5A illustrates an exemplary interface for presentation of discovered organizational telemetry data for use with embodiments of the present disclosure;

FIG. 5B illustrates an exemplary interface for presentation of discovered organizational telemetry data for use with embodiments of the present disclosure;

FIG. 5C illustrates an exemplary interface for presentation of discovered organizational telemetry data for use with embodiments of the present disclosure;

FIG. 5D illustrates an exemplary interface for presentation of discovered organizational telemetry data for use with embodiments of the present disclosure;

FIG. 5E illustrates an exemplary interface for presentation of discovered organizational telemetry data for use with embodiments of the present disclosure;

FIG. 5F illustrates an exemplary interface for presentation of discovered organizational telemetry data for use with embodiments of the present disclosure;

FIG. 5G illustrates an exemplary interface for presentation of discovered organizational telemetry data for use with embodiments of the present disclosure;

FIG. 5H illustrates an exemplary interface for presentation of discovered organizational telemetry data for use with embodiments of the present disclosure;

Figure 6A:
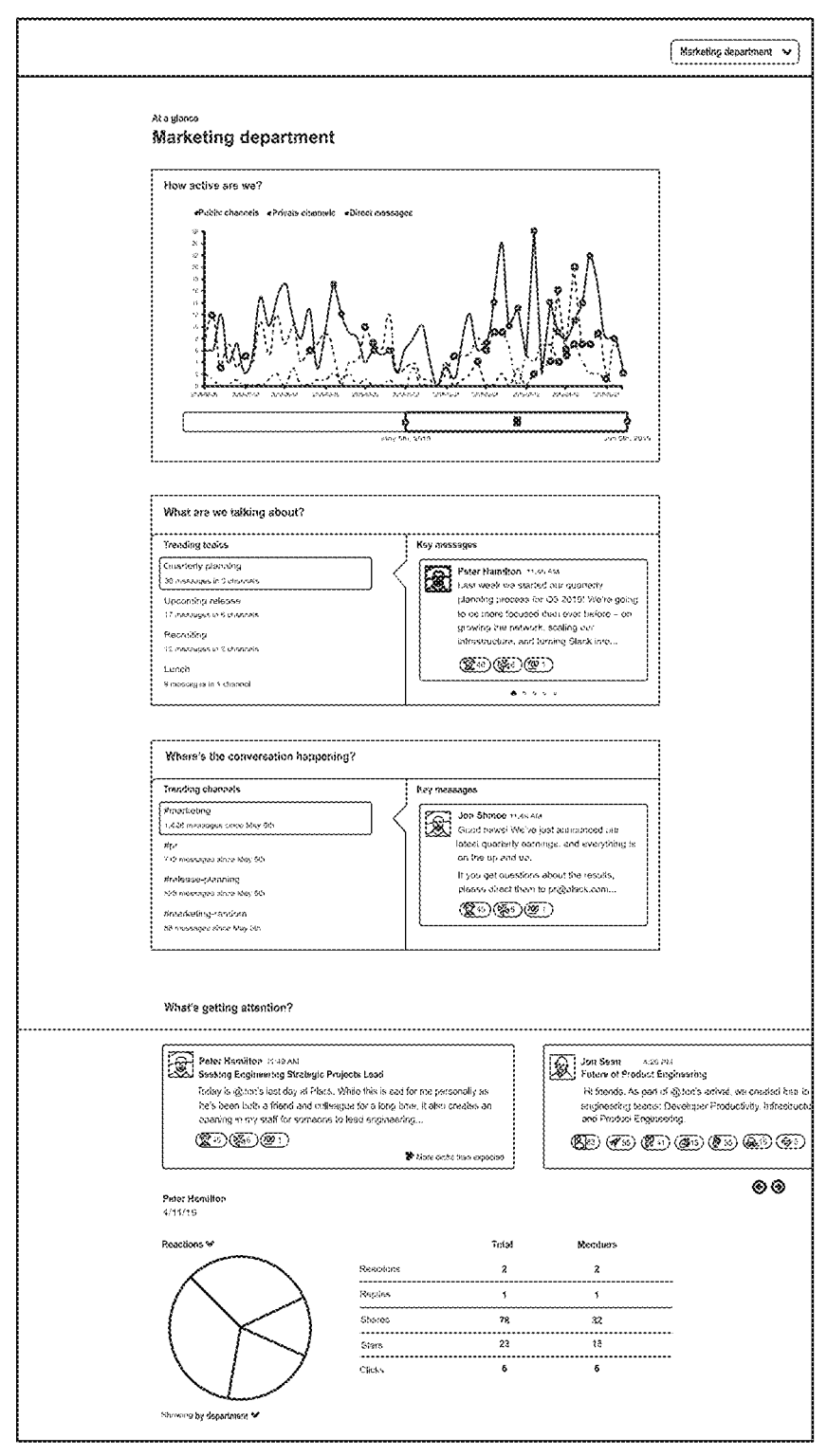

FIG. 6A illustrates an exemplary interface for presentation of discovered organizational telemetry data for use with embodiments of the present disclosure;

FIG. 6B illustrates an exemplary interface for presentation of discovered organizational telemetry data for use with embodiments of the present disclosure;

FIG. 6C illustrates an exemplary interface for presentation of discovered organizational telemetry data for use with embodiments of the present disclosure;

FIG. 6D illustrates an exemplary interface for presentation of discovered organizational telemetry data for use with embodiments of the present disclosure;

FIG. 6E illustrates an exemplary interface for presentation of discovered organizational telemetry data for use with embodiments of the present disclosure;

FIG. 6F illustrates an exemplary interface for presentation of discovered organizational telemetry data for use with embodiments of the present disclosure;

FIG. 7 illustrates an exemplary interface for presentation of discovered organizational telemetry data for use with embodiments of the present disclosure;

FIG. 8A illustrates an exemplary interface for presentation of discovered organizational telemetry data for use with embodiments of the present disclosure;

FIG. 8B illustrates an exemplary interface for presentation of discovered organizational telemetry data for use with embodiments of the present disclosure;

FIG. 8C illustrates an exemplary interface for presentation of discovered organizational telemetry data for use with embodiments of the present disclosure;

FIG. 8D illustrates an exemplary interface for presentation of discovered organizational telemetry data for use with embodiments of the present disclosure;

FIG. 8E illustrates an exemplary interface for presentation of discovered organizational telemetry data for use with embodiments of the present disclosure;

FIG. 8F illustrates an exemplary interface for presentation of discovered organizational telemetry data for use with embodiments of the present disclosure;

FIG. 8G illustrates an exemplary interface for presentation of discovered organizational telemetry data for use with embodiments of the present disclosure; and FIG. 8H illustrates an exemplary interface for presentation of discovered organizational telemetry data for use with embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to discovery of organizational telemetry within a group-based communication system. The group-based communication system described in this disclosure comprises one or more group-based communication servers and one or more group-based communication repositories.

Providing a programmatic view of how client devices are interacting with a group-based communication system across an organization comprising a plurality of client devices requires a tedious and thorough review of each and every interaction stored in a group-based communication repository. Further, knowing what data to review within the group-based communication repository is a complex and near impossible task.

The inventors have identified that the system resources and time allocated to such analyses within the context of a group-based communication system are easily exhausted and compromised as a result of the complex design and storage needs of a group-based communication system.

Organization telemetry discovery according to embodiments of the present disclosure enable a dashboard for programmatically detecting the most unusually trending likes, files, channels, and so on across an organization. Examples of organization telemetry include but are not limited to:

Channels with bursts of activity (discussion) from any client devices associated with user identifiers, likely in larger, team-wide channels.

Links (URLS) that have an unusually high level of engagement across the organization.

Files client devices are sharing and opening unusually often across the organization.

Topics gaining in popularity across the company, potentially clustered by channel (e.g., exogenous trend detection, anomaly detection).

Attention dedicated from different teams to other teams, from users to other users, from teams looking inward, and the like.

The present disclosure enables the discovery of organizational telemetry through methods that reduce data processing time, reduce memory required for storage of data representing organizational telemetry metrics, and reduce network traffic required to perform analysis of organizational interactions with a group-based communication system.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, computers, and the like.

"Group-based" is used herein to refer to a system, channel, message, or virtual environment that has security sufficient such that it is accessible only to a defined group of users. The group may be defined by common access credentials such as those of an organization. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier," "group-based communication team identifier," or "team identifier" refer to one or more items of data by which a group within a group-based communication system may be identified. For example, a group identifier may comprise ASCII text, a pointer, a memory address, and the like. In embodiments, group identifier and team identifier are not used interchangeable. For example, a group identifier may be associated with a custom group of user identifiers within the group-based communication system. In embodiments, user identifiers associated with a group identifier are selected and/or retrieved, and then interaction signals associated with those user identifiers may be used for discovery of organizational telemetry. In embodiments, a particular team may be considered a group (in which case each user identifier within the team and group may be associated with a common team identifier as well as a common group identifier). In other embodiments, an arbitrary and custom group of users may be considered a group and may therefore be associated with the same group identifier.

As used herein, the terms "messaging communication," "group-based communication message," and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are transmitted by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "public group-based communication channel" refers to a group-based communication channel without restricted access, such that is it generally accessible and/or searchable by other members of the group-based communication system.

The terms "group-based communication system" or "group-based communication platform" refer to a networked electronic communications environment comprising one or more group-based communication repositories and one or more group-based communication servers that are configured to enable group-based collaborative communication between members of an organization. In some embodiments, the group-based communication system may be operated and instituted by a third-party. The group-based communication system has increased requirement for availability, scalability, performance, compatibility and security over non-networks (e.g., a home internet network) and may span multiple s and allow cross collaboration between not only members of different groups within an or organization, but also collaboration between members and teams of multiple organizations. An organization may comprise a plurality of teams or groups as well as channels, and each team or group may comprise a plurality of channels. The organization comprises a plurality of members, and a team comprises a plurality of members. In examples, not all members of an organization are encompassed within a particular team.

The terms "group-based communication organization identifier" or "organization identifier" refer to one or more items of data by which an organization within a group-based communication system may be identified. For example, an organization identifier may comprise ASCII text, a pointer, a memory address, and the like.

The term "user identification" or "user identifier" refers to one or more items data by which a user of a client device may be uniquely identified. In some embodiments, the user identification may be an email address, a unique identification string, an employee number, a social security number, a driver's license number, and the like.

The term "group-based communication system data corpus" refers to a collection of data that has been received by a group-based communication system through group-based communication interfaces. In some embodiments, a group-based communication system data may comprise one or more of a group-based communication data work objects, group-based communication messages, group-based communication channels, or user profiles associated with the group-based communication system.

As used herein, the terms "group-based communication object," "group-based communication data object," and "group-based communication data work object" refer to a collection of data and instructions that represent an item or resource of the group-based communication system. Each group-based communication object has an object identifier that uniquely identifies a particular group-based communication object in the group-based communication system and an object type, which describes the category of objects to which the group-based communication object belongs. In some embodiments, users may perform actions via a group-based communication interface that create or modify group-based communication objects. Example group-based communication objects include group-based communication messages, group-based communication channels, user profile identifiers, indications of user profiles (such as pointers with reference to user profiles), files created and maintained in the group-based communication system, files linked or uploaded to the group-based communication system, user accounts, emojis posted in a group-based communication channel, emojis available in a group-based communication channel, metadata associated with group-based communication messages such as an author identifier, a timestamp, a channel identifier, user identifiers of users with access rights to the group-based communication message, and the like.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined herein.

A group-based communication interface is a user interface of the group-based communication system and has security sufficient such that it is accessible only to a defined group of users. As discussed herein, access may be facilitated by a group-based communication interface invitation to join transmitted by one group member user to another non-member user. As used herein, a "group-based communication interface account" is a designation to which messages may be delivered in the group-based communication system and associated with the respective group-based communication interface. The group-based communication interface account may have an identifier, referred to as a group-based communication identifier, which identifies the group-based communication interface account and may comprise ASCII text, a pointer, a memory address, and the like. For instance, the group-based communication interface identifier may be an email address (e.g., comprising a local-part, an @ symbol, then a case-insensitive domain).

The terms "group administrator," "group admin" "team administrator," "team admin," "administrator," or "organization administrator" refer to credentials or identifiers associated with user profile that indicate to a group-based communication server that a client device associated with the user profile may edit access control parameters (e.g. channel settings) of respective groups and group-based communication channels having identifiers associated with the user profile. In some embodiments, group administrators transmit channel creation requests to the group-based communication server to create group-based communication channels for a particular group. Users identified as group administrators may edit the access control rights to a group or group-based communication channel which the group is a part of. Group administrators may also add users to the group or group-based communication channel which the group is a part of or to invite users to a group or group-based communication channel which the group is a part of. The access control parameters editable by the group administrator may be limited by the settings set by a super administrator.

The terms "members of the organization," "users of the organization," and other like phrases refer to users of the group-based communication system that have global identifiers and/or user identifiers in their user profile. Users access the group-based communication system using client devices.

The terms "interaction data" and "group-based communication interaction signal" refer to signals associated with interaction by client devices with a group-based communication system. In embodiments, interaction data can be any of user account creations, direct message transmissions, group-based communication channels created, group-based communication channels joined, messages read, messages written, messages read within a channel, feature uses, emoji uses or reactions, cursor mark movements, files uploaded, files downloaded, files shared, links shared, links accessed, group-based communication channel deletions, user account deletions, calls placed, teams joined, and teams created.

The term "interaction" refers to an identifiable, non-transitory occurrence that has technical significance for system hardware and/or software. For example, in a group-based communication channel, a message transmitted by a client device is an interaction. In another example, a client device placing a cursor over a message within a group-based communication system is an interaction. An interaction may be user-generated, such as keystrokes or mouse movements, or system-generated, such as program loading and errors.

In embodiments, interactions can be categorized or identified as different types of cursor marks (i.e., where a cursor is displayed on a client device within the group-based communication interface, how the cursor is moved or used on the client device within the group-based communication interface, and the like). Examples of different types of cursor marks or uses include a blue bar click, a blue bar dismiss, viewed, marked as read, left (i.e., departed), closed, sent, marked as unread, muted, esc, esc all, back, clicked, deleted, or none qualify.

The term "group-based communication interaction signal metadata" refers to metadata associated with a particular group-based communication interaction signal. In embodiments, group-based communication interaction signal metadata comprises a user identifier, a group-based communication organization identifier, a group-based communication team identifier, a group-based communication interaction type, a group-based communication interaction source type, a group-based communication interaction source identifier, a group-based communication interaction source identifier, and a timestamp.

The term "group-based communication interaction type" refers to a type of interaction between a client device and a group-based communication system that created the group-based communication interaction signal. In embodiments, a group-based communication interaction type is one of a reaction, a selection, a share, a read, and group-based communication message inclusion.

The term "group-based interaction source type" refers to a digital item with which a client device interacted within a group-based communication system. In embodiments, a group-based communication interaction source type is one of a group-based communication channel, a file, a link, and a group-based communication message.

The term "group-based communication interaction source identifier" refers to one or more items of data by which a group-based communication interaction source may be identified. For example, a group-based communication interaction source identifier may comprise ASCII text, a pointer, a memory address, and the like. In embodiments, a group-based communication interaction source identifier is one of a group-based communication channel identifier, a file identifier, a link identifier, and a group-based communication message identifier.

The term "group-based communication interaction signal data structure" refers to a data structure comprising a plurality of group-based communication interaction signal data structure records for storing and associating group-based communication interaction signal metadata with a group-based communication interaction signal.

The term "long term group-based communication interaction signal occurrence tally" refers to a number of times a group-based communication interaction signal associated with a group-based communication interaction signal data structure has occurred over a network time period. In embodiments, the long term group-based communication interaction signal occurrence tally is based on long term group-based communication interaction signal data retrieved from a group-based communication repository. In embodiments, the particular network time period may be the last ten weeks.

The term "predicted short term group-based communication interaction signal occurrence tally" refers to a programmatically generated expected number of times a group-based communication interaction signal associated with a group-based communication interaction signal data structure will occur over a particular network time period. In embodiments, the predicted short term group-based communication interaction signal occurrence tally" is based at least on the long term group-based communication interaction signal occurrence tally. In embodiments, the particular network time period may be within the last week.

The term "actual short term group-based communication interaction signal occurrence tally" refers to a number of times a group-based communication interaction signal associated with a group-based communication interaction signal data structure occurred over the particular network time period. In embodiments, the short term group-based communication interaction signal occurrence tally is based on short term group-based communication interaction signal data retrieved from a group-based communication repository.

The term "group-based communication interaction signal occurrence divergence measure" refers to a comparison between the predicted short term group-based communication interaction signal occurrence tally and the actual short term group-based communication interaction signal occurrence tally. The "divergence measure" is a data item representative of the difference between the predicted and actual short term group-based communication interaction signal occurrence tallies. In embodiments, a group-based communication interaction signal occurrence divergence measure is calculated based upon a K-S (Kolmogorov-Smirnov) test or algorithm. A K-S test or algorithm quantifies a distance between two samples.

The term "group-based communication interaction signal data structure record rank value" refers to a position in a list relative to other group-based communication interaction signal data structures assigned to a particular group-based communication interaction data structure. In embodiments, the group-based communication interaction signal data structure record rank value is based at least on the group-based communication interaction signal occurrence divergence measure.

The term "ordered group-based communication interaction signal data structure records list" refers to a data structure comprising a plurality of group-based communication interaction signal data structure records arranged in an order according to their respective group-based communication interaction signal data structure record rank values.

The term "group-based communication interaction signal trends interface" refers to instructions configured to cause rendering of a visual representation of group-based communication interaction signal trends detected or identified as described herein. In embodiments, the group-based communication interaction signal trends interface may include any text, image, video, audio, or combination thereof generated by the group-based communication system or provided by a user (using a client device) that may then be rendered on the group-based communication interface.

The term "requesting client device" or "requesting computing device" refers to a computing device from which a request for organizational telemetry data has been received.

The term "geolocation identifier" refers to one or more items data by which a geographic location of a client device may be uniquely identified. In some embodiments, the geolocation identifier may comprise GPS coordinates, an identifier of a particular location (e.g., building within an organization), or an identifier representing a geo-fence.

The term "organizational title identifier" refers to one or more items of data by which a title of a user within an organization may be identified. In some embodiments, an organizational title may be "President," "CEO," "Manager," and the like. In some embodiments, the organizational title identifier may comprise ASCII text, a pointer, a memory address, and the like.

The term "organizational role identifier" refers to one or more items of data by which a role of a user within an organization may be identified. In some embodiments, an organizational role may be "engineer," "administration," "management," and the like. In some embodiments, the organizational title identifier may comprise ASCII text, a pointer, a memory address, and the like.

The term "organizational tenure identifier" refers to one or more items of data by which a tenure of a user within an organization may be identified. In some embodiments, an organizational tenure may be "recent hire," "near retirement," "5 years or less," "more than 5 years," and the like. In some embodiments, an organizational tenure may be a number of years a user has been associated with the organization. In some embodiments, the organizational tenure identifier may comprise ASCII text, a pointer, a memory address, and the like.

The term "organizational position identifier" refers to one or more items of data by which a position of a user within a reporting structure of an organization may be identified. In some embodiments, an organizational position may be "direct report," "manager," "executive," and the like. In some embodiments, the organizational title identifier may comprise ASCII text, a pointer, a memory address, and the like.

The term "sentiment" refers to an emotion or feeling associated with an event, situation, message, reaction, topic, and the like. In embodiments, a sentiment is associated with the use of a phrase or word within a group-based communication message. In embodiments, a sentiment may be "bad," "good," "positive," "negative," and the like.

The term "sentiment identifier" refers to one or more items of data by which a sentiment may be identified. In some embodiments, the sentiment identifier may comprise ASCII text, a pointer, a memory address, and the like.

The term "attention score" refers to a programmatically generated measure of interactions between a first client device (associated with a first user identifier) and a second client device (associated with a second user identifier) of a group-based communication system. In embodiments, an attention score represents a percentage of a possible attention percentage a user identifier is associated with interactions associated with a unique other user identifier. In embodiments, the attention score represents a likelihood that a first client device associated with the user identifier will interact via the group-based communication system with a second client device associated with the unique other user identifier.

The term "attention score vector" refers to a data structure associated with a user identifier, the data structure comprising one or more "attention score vector records," where each attention score vector record comprises a programmatically generated measure of interactions between the user identifier (the interactions performed by way of a client device) and a unique other user identifier of a plurality of user identifiers of a group-based communication system.

The term "attention score interface" refers to instructions configured to cause rendering of a visual representation of attention scores detected or identified as described herein. In embodiments, the attention score interface may include any text, image, video, audio, or combination thereof generated by the group-based communication system or provided by a user (using a client device) that may then be rendered within a group-based communication interface.

The term "attention score visual representation" refers to instructions configured to visually represent programmatically generated attention scores and related information according to embodiments herein.

The term "attention pane" refers to a defined pane within a group-based communication interface configured for rendering visual representations of attention scores as described herein.

The term "network graph" refers to a visual representation of one or more user priority scores associated with a common organization identifier (e.g., illustrating relationships between user identifiers associated with the common organization identifier).

The term "user priority score" refers to a programmatically generated representation of a relationship between a first user identifier and a second user identifier, based on interaction associated with both the first user identifier and the second user identifier within a group-based communication system. In embodiments, the interactions may be a count of messages transmitted from the first user identifier to the second user identifier, a count of messages read by a client device associated with the first user identifier (e.g., where the messages were transmitted by a client device associated with the second user identifier), a count of how many common channel identifiers with which both the first user identifier and second user identifier are associated, and the like. In embodiments, a user priority score is generated for a first user identifier for each of a plurality of other unique user identifiers of a group-based communication system.

The term "topic similarity score" refers to a programmatically generated representation of a relationship between a first topic and a second topic. In embodiments, the relationship indicates a similarity between the first topic and the second topic. In embodiments, a topic similarity score for a first topic associated with a second topic represents a programmatically generated measure of how similar the second topic is to the first topic. In embodiments, term frequency-inverse document frequency (tf-idf) of each word within each group-based communication data object may be determined, and a topic similarity score for a first topic and a second topic may be calculated based on a number of words that the first topic and the second topic have in common with each word weighted by tf-idf. In other embodiments, a machine learning model may be used to generate each topic similarity score.

The term "possible attention percentage" refers to a total amount of "attention" a particular user identifier may "give" another user identifier. For example, a user identifier may only be associated with 100% possible attention. Accordingly, user priority scores associated with other user identifiers, for the particular user identifier, may be normalized according to the 100% possible attention. Continuing the example, for a given user identifier, the user priority score for a user A is 0.4, for a user B is 0.5, for a user C is 0.3, and for a user D is 0.3. The user priority scores tally to be 1.5, however the given user identifier may only dedicate 100% attention. Accordingly, the attention score, for the given user identifier, for user A is calculated by normalizing the user priority score to 0.267 (i.e., 0.4/1.5), for user B is calculated by normalizing the user priority score to 0.333 (i.e., 0.5/1.5), for user C is calculated by normalizing the user priority score to 0.2 (i.e., 0.3/1.5) and for user D is calculated by normalizing the user priority score to 0.2 (i.e., 0.3/1.5). It will be appreciated that the foregoing example is for illustrative purposes only and is not intended to be limiting in any way.

The term "long term attention score" refers to a percentage of possible attention percentage a user identifier has been associated with interactions associated with a unique other user identifier during a first network time period. In embodiments, the first network time period may be the last ten weeks.

The term "predicted short term attention score" refers to a programmatically generated expected percentage of possible attention percentage a user identifier will be associated with interactions associated with a unique other user identifier during a second network time period. In embodiments, the predicted short term attention score is based at least in part on a long term attention score. In embodiments, the second network time period may be within the last week.

The term "actual short term attention score" refers to a programmatically generated percentage of possible attention percentage the user identifier was associated with interactions associated with the unique other user identifier during the second network time. In embodiments, the second network time period may be within the last week.

The term "attention score divergence measure" refers to refers to a comparison between the predicted short term attention score and the actual short term attention score. The "divergence measure" is a data item representative of the difference between the predicted and actual short term attention scores. In embodiments, an attention score divergence measure is calculated based upon a K-S (Kolmogorov-Smirnov) test or algorithm. A K-S test or algorithm quantifies a distance between two samples.

The term "attention score vector rank value" refers to a position in a list relative to other attention score vector records assigned to a particular attention score vector record. In embodiments, the attention score vector rank value is based at least in part on an attention score divergence measure.

The term "ordered attention score vector record list" refers to a data structure comprising a plurality of attention score vector records arranged in an order according to their respective attention score vector rank values.

The term "attention score trend interface" refers to instructions configured to cause rendering of a visual representation of attention score trends detected or identified as described herein. In embodiments, the attention score trend interface may include any text, image, video, audio, or combination thereof generated by the group-based communication system or provided by a user (using a client device) that may then be rendered within a group-based communication interface.

The term "topic similarity threshold" refers to a predefined value representing a minimum level of similarity that must identified as associated with a first and second topic in order for them to be clustered together as part of a same topic. In embodiments, a first topic may be clustered with a second topic upon determining the topic similarity score associated with them exceeds a topic similarity threshold.

The term "universal record locator (URL)" refers to a reference to a web or networked resource that specifies the resources location on a computer network and a mechanism for retrieving it. A URL may also be referred to as a Uniform Resource Identifier (URI). URLs may reference web pages (http), may be used for file transfer (ftp), email (mailto), database access (JDBC), and many other applications.

The term "universal record locator (URL) identifier" refers to one or more items of data by which a universal record locator (URL) may be uniquely identified by a group-based communication or communication system. In embodiments, the universal record locator (URL) identifier may comprise ASCII text, a pointer, a memory address, and the like.

The term "universal record locator (URL) text" refers to ASCII text contained within the body of a universal record locator (URL). For example, a universal record locator (URL) of "www.google.com" may be considered to contain universal record locator (URL) text of "google." In another example, a universal record locator (URL) of "www.funnyordie.com/trump/speeches" may be considered to contain universal record locator (URL) text of one or more of "funny," "die," "trump," or "speeches."

The term "custom shortened universal record locator (URL)" refers to a universal record locator (URL) that has been made substantially shorter but still directs to the required resource.

This is achieved by using a redirect which links the resource that has a long or undesirable universal record locator (URL). For example, the URL "https://example.com/assets/category_B/subcategory_C/Foo/" can be shortened to "https://example.com/Foo," and the URL "http://example.com/about/index.html" can be shortened to "https://goo.gl/aO3Ssc." Often the redirect domain name is shorter than the original one. A shortened URL may be desired for messaging technologies that limit the number of characters in a message (for example SMS), for reducing the amount of typing required if the reader is copying a URL from a print source, for making it easier for a person to remember, or for the intention of a permalink. Other uses of URL shortening are to "beautify" a link, track clicks, or disguise the underlying address.

The term "custom shortened universal record locator (URL) text" refers to ASCII text contained within the body of a custom shortened universal record locator (URL). For example, for the custom shortened universal record locator (URL) of "https://goo.gl/aO3Ssc," the text may be considered herein to be "goo.gl" or "aO3Ssc."

The "prefix" refers to a host name associated with a universal record locator (URL) or a custom shortened universal record locator (URL). In embodiments, a hostname is a label that is assigned to a device connected to a computer network and that is used to identify the device in various forms of electronic communication, such as the World Wide Web. Hostnames may be simple names consisting of a single word or phrase, or they may be structured. Internet hostnames may have appended the name of a Domain Name System (DNS) domain, separated from the host-specific label by a period ("dot"). In the latter form, a hostname is also called a domain name. If the domain name is completely specified, including a top-level domain of the Internet, then the hostname is said to be a fully qualified domain name (FQDN). Hostnames that include DNS domains are often stored in the Domain Name System together with the IP addresses of the host they represent for the purpose of mapping the hostname to an address, or the reverse process. For example, in a URL with the text "www.twitter.com" or "t.co," the prefix may be considered herein to be "twitter" (because t.co is also associated with twitter). As another example, in a URL with the text "www.nyt.com/Pelosi," the prefix may be considered herein to be "nyt" or "New York Times." As another example, for the custom shortened universal record locator (URL) of "https://goo.gl/aO3Ssc," the prefix may be considered herein to be "goo.gl" or "Google."

Example System Architecture

Methods, apparatuses, and computer program products of the present disclosure may be embodied by any of a variety of devices. For example, the method, apparatus, and computer program product of an example embodiment may be embodied by a networked device (e.g., a group-based communication platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as configured herein. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be transmitted from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, an organization identifier, a group or team identifier, a group-based communication channel identifier, a timestamp, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only one to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
```

```
      <client_product_type>iPhone6,1</client_product_type>
      <client_serial_number>DNXXX1X1XXXX</client_serial_number>
      <client_UDID>3XXXXXXXXXXXXXXXXXXXXXXXXXD</client_UDID>
      <client_OS>iOS</client_OS>
      <client_OS_version>7.1.1</client_OS_version>
      <client_app_type>web browser</client_app_type>
      <client_name>Mobile Safari</client_name>
      <client_version>9537.53</client_version>
   </client_details>
   <client_details>//Android Client with Webbrowser
      <client_IP>10.0.0.123</client_IP>
      <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
      <client_product_type>Nexus S</client_product_type>
      <client_serial_number>YXXXXXXXXZ</client_serial_number>
      <client_UDID>FXXXXXXXXX-XXXX-XXXX-XXXX-
XXXXXXXXXXXX</client_UDID>
      <client_OS>Android</client_OS>
      <client_OS_version>4.0.4</client_OS_version>
      <client_app_type>web browser</client_app_type>
      <client_name>Mobile Safari</client_name>
      <client_version>534.30</client_version>
   </client_details>
   <client_details> //Mac Desktop with Webbrowser
      <client_IP>10.0.0.123</client_IP>
      <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
      <client_product_type>MacPro5,1</client_product_type>
      <client_serial_number>YXXXXXXXXZ</client_serial_number>
      <client_UDID>FXXXXXXXXX-XXXX-XXXX-XXXX-
XXXXXXXXXXXX</client_UDID>
      <client_OS>Mac OS X</client_OS>
      <client_OS_version>10.9.3</client_OS_version>
      <client_app_type>web browser</client_app_type>
      <client_name>Mobile Safari</client_name>
      <client_version>537.75.14</client_version>
   </client_details>
   <message>
      <message_identifier>ID_message_10</message_identifier>
      <team_identifier>ID_team_1</team_identifier>
      <channel_identifier>ID_channel_1</channel_identifier>
      <contents>That is an interesting invention. I have attached a copy our patent
policy.</contents>
      <attachments>patent_policy.pdf</attachments>
   </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, an organization identifier, a timestamp, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
   <message_identifier>ID_message_10</message_identifier>
   <team_identifier>ID_team_1</team_identifier>
   <channel_identifier>ID_channel_1</channel_identifier>
   <sending_user_identifier>ID_user_1</sending_user_identifier>
   <topics>
      <topic>inventions</topic>
      <topic>patents</topic>
      <topic>policies</topic>
   </topics>
   <responses>
      <response>liked by ID_user_2</response>
```

```
    <response>starred by ID_user_3</response>
  </responses>
  <contents>That is an interesting invention. I have attached a copy our patent
  policy.</contents>
  <attachments>patent_policy.pdf</attachments>
  <conversation_primitive>
    conversation includes messages: ID_message_8, ID_message_9, ID_message_10,
       ID_message_11, ID_message_12
  </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, a sentiment may be associated with the message. In one implementation, the message contents may be parsed (e.g., using PHP commands) to determine an overall sentiment the message. For example, hashtags in the message may indicate a sentiment associated with the message. In another example, the message may be analyzed (e.g., by itself, with other messages in a conversation primitive) or parsed using a machine learning technique, such as sentiment modeling, to determine sentiments associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
        SELECT messageResponses
        FROM MSM_Message
        WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, organization, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

In embodiments, group-based communication system 105 is further accessible by and to third party application provider servers 111. Accordingly, third party resources as well as bots can interact electronically with and within group-based communication system 105.

In embodiments, group-based communication system 105 further comprises a group-based communication telemetry server 108 in communication with group-based communication server 106 and group-based communication repository 107. Group-based communication telemetry server 108 is configured to facilitate discovery of organizational telemetry within a group-based communication system 105 according to embodiments disclosed herein.

Examples of messaging search and management apparatuses and methods for use with embodiments of the present disclosure are disclosed in U.S. patent application Ser. No. 15/651,887, titled "MESSAGING SEARCH AND MANAGEMENT APPARATUSES, METHODS AND SYSTEMS," filed Jul. 17, 2017 (now U.S. Pat. No. 9,940,394), the contents of which are incorporated herein by reference in their entirety.

Example Apparatus for Implementing Embodiments of the Present Disclosure

The group-based communication server 106 may be embodied by one or more computing systems, such as apparatus 200 shown in FIG. 2A. The apparatus 200 may include a processor 202, a memory 201, input/output circuitry 203, communications circuitry 205, group-based communication repository 107 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry

205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

The group-based communication telemetry server 108 may be embodied by one or more computing systems, such as apparatus 210 shown in FIG. 2B. The apparatus 210 may include a processor 212, a memory 211, input/output circuitry 213, communications circuitry 215, and organizational telemetry discovery circuitry 214. The apparatus 210 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 210 may provide or supplement the functionality of particular circuitry. For example, the processor 212 may provide processing functionality, the memory 211 may provide storage functionality, the communications circuitry 215 may provide network interface functionality, and the like.

In some embodiments, the processor 212 (and/or co-processor or any other processing circuitry assisting or otherwise associated with the processor) may be in communication with the memory 211 via a bus for passing information among components of the apparatus. The memory 211 may be non-transitory and may include, for example, one or more volatile and/or non-volatile memories. In other words, for example, the memory may be an electronic storage device (e.g., a computer readable storage medium). The memory 211 may be configured to store information, data, content, applications, instructions, or the like, for enabling the apparatus to carry out various functions in accordance with example embodiments of the present disclosure.

The processor 212 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 212 may be configured to execute instructions stored in the memory 211 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 210 may include input/output circuitry 213 that may, in turn, be in communication with processor 212 to provide output to the user and, in some embodiments, to receive an indication of a user input. The input/output circuitry 213 may comprise a user interface and may include a display and may comprise a web user interface, a mobile application, a client device, a kiosk, or the like. In some embodiments, the input/output circuitry 213 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 211, and/or the like).

The communications circuitry 215 may be any means such as a device or circuitry embodied in either hardware or a combination of hardware and software that is configured to receive and/or transmit data from/to a network and/or any other device, circuitry, or module in communication with the apparatus 210. In this regard, the communications circuitry 215 may include, for example, a network interface for enabling communications with a wired or wireless communication network. For example, the communications circuitry 215 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

In embodiments of the group-based communication telemetry server 108, the organizational telemetry discovery circuitry 214 includes hardware further configured to support discovery of organizational telemetry within a group-based communication system. The group-based communication telemetry circuitry 214 may utilize processing circuitry, such as the processor 212, to perform these actions. The organizational telemetry discovery 214 may send and/or receive data from group-based communication repository 107 or other repository. In some implementations, the sent and/or received data may be of digital content objects organized among a plurality of group-based communication channels. It should also be appreciated that, in some embodiments, the group-based communication circuitry 214 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Discovering Organization Telemetry within a Group-Based Communication System The present disclosure provides for the discovery of deep insights into how client devices associated with user identifiers that are also associated with various group-based communication identifiers (e.g., group identifiers, team identifiers, organizational identifiers, and the like) are electronically interacting with a group-based communication platform and with one another within the group-based communication platform.

FIGS. 3A and 3B illustrate exemplary generation 300 of an attention score interface for use with embodiments of the present disclosure. In embodiments, an apparatus comprises at least one processor and at least one memory storing computer code that, when executed by the at least one processor, causes the apparatus to generate an attention score interface according to functions described herein.

In embodiments, the apparatus is configured to, for each user identifier of a plurality of user identifiers of a group-based communication system and based on a group-based communication data corpus, generate 301 an attention score vector comprising a plurality of attention scores. In embodiments, each attention score is associated with a unique other user identifier of the plurality of user identifiers. In embodiments, the group-based communication data corpus comprises group-based communication object received (301A) from a plurality of client devices by a group-based communication system.

In embodiments, the apparatus is further configured to transmit 303 for rendering an attention score interface comprising an attention score visual representation based in part on one or more attention score vectors.

In embodiments, the apparatus is further configured to generate each attention score for a user identifier by calculating 302A a user priority score associated with the unique other user identifier and normalizing 302B the user priority score relative to other user priority scores according to a possible attention percentage.

In embodiments, the attention score represents a percentage of the possible attention percentage the user identifier is associated with interactions associated with the unique other user identifier. In embodiments, the attention score represents a likelihood that a first client device associated with the user identifier will interact via the group-based communication system with a second client device associated with the unique other user identifier.

In embodiments, the attention score visual representation is organized according to organization identifiers associated with each of the unique other user identifiers of the plurality of user identifiers.

In embodiments, the attention score visual representation is organized according to team identifiers associated with each of the unique other user identifiers of the plurality of user identifiers.

In embodiments, the attention score visual representation is organized according to channel identifiers associated with each of the unique other user identifiers of the plurality of user identifiers.

In embodiments, the attention score visual representation comprises a grouping of attention scores associated with user identifiers associated with a common team identifier.

In embodiments, the attention score visual representation comprises one or more attention panes comprising one or more distinct groupings of attention scores associated with user identifiers associated with a common distinct team identifier.

In embodiments, the attention score visual representation comprises a network graph generated based on all of the user priority scores associated with a common organization identifier.

In embodiments, the attention score visual representation comprises a grouping of attention scores associated with user identifiers associated with a common role type identifier.

In embodiments, the apparatus is further configured to, for each attention score vector record of the plurality of attention score vectors, generate 304A a group-based communication attention score divergence measure based at least in part on a predicted short term attention score and an actual short term attention score and assign 304B an attention score rank value to the attention score vector record based at least in part on the attention score occurrence divergence measure.

In embodiments, the apparatus is further configured to arrange 304C in an ordered attention score vector record list each of the attention score vector records in an order according to their attention score vector record rank values.

In embodiments, the apparatus is further configured to transmit 305 an attention score trend interface for rendering by the display device of the requesting client device, wherein the attention score trend interface is generated based in part on the ordered attention score vector record list.

In embodiments, the apparatus is configured to receive 306 a request for organizational telemetry discovery from a requesting device.

In embodiments, the predicted short term attention score is based at least on a long term attention score. In embodiments, the predicted short term attention score is representative of a programmatically generated expected percentage of possible attention percentage the user identifier will be associated with interactions associated with the unique other user identifier during a second network time period.

In embodiments, the long term attention score is representative of a percentage of possible attention percentage the user identifier has been associated with interactions associated with the unique other user identifier during a first network time period.

In embodiments, the actual short term attention score is representative of a percentage of possible attention percentage the user identifier was associated with interactions associated with the unique other user identifier during the second network time period.

FIGS. 4A and 4B illustrate an exemplary generation 400 of a group-based communication interaction signal trends interface for use with embodiments of the present disclosure. In embodiments, an apparatus comprises at least one processor and at least one memory storing computer code that, when executed by the at least one processor, causes the apparatus to generate a group-based communication interaction signal trends interface according to functions described herein.

In embodiments, the apparatus is configured to, for each group-based communication interaction signal of a plurality of group-based communication interaction signals, extract 401 group-based communication interaction signal metadata into a group-based communication interaction signal data structure.

In embodiments, the apparatus is further configured to, for each of a plurality of group-based communication interaction signal data structure records of each group-based communication interaction signal data structure, generate 402A a group-based communication interaction signal occurrence divergence measure based at least in part on a predicted short term group-based communication interaction signal occurrence tally and an actual short term group-based communication interaction signal occurrence tally.

In embodiments, the apparatus is further configured to assign 402B a group-based communication interaction signal data structure record rank value to the group-based communication interaction signal data structure record based at least in part on the group-based communication interaction signal occurrence divergence measure.

In embodiments, the apparatus is further configured to arrange 403 in an ordered group-based communication interaction signal data structure records list each of the group-based communication interaction signal data structure records in an order according to their group-based communication interaction signal data structure record rank values.

In embodiments, the apparatus is further configured to transmit 404 a group-based communication interaction signal trends interface for rendering within a display device of a requesting client device. In embodiments, the group-based communication interaction signal trends interface is generated based in part on the ordered group-based communication interaction signal data structure records list.

In embodiments, the plurality of group-based communication interaction signals is received (401A) from a plurality of client devices. In embodiments, each client device is associated with a user identifier within a group-based communication system. In embodiments, the plurality of group-based communication interaction signals is stored (401B) by a group-based communication system in a group-based communication repository.

In embodiments, the apparatus is configured to receive 406 a request for organizational telemetry discovery from a requesting device.

In embodiments, the predicted short term group-based communication interaction signal occurrence tally based at least part on a long term group-based communication interaction signal occurrence tally. In embodiments, the predicted short term group-based communication interaction signal occurrence tally is representative of a programmatically generated expected number of times a group-based communication interaction signal associated with the group-based communication interaction signal data structure will occur over a second network time period.

In embodiments, the long term group-based communication interaction signal occurrence tally is representative of a number of times a group-based communication interaction signal associated with the group-based communication interaction signal data structure has occurred over a first network time period. In embodiments, the long term group-based communication interaction signal occurrence tally is based on long term group-based communication interaction signal data retrieved from a group-based communication repository.

In embodiments, the actual short term group-based communication interaction signal occurrence tally is representative of a number of times a group-based communication interaction signal associated with the group-based communication interaction signal data structure occurred over the second network time period. In embodiments, the short term group-based communication interaction signal occurrence tally is based on short term group-based communication interaction signal data retrieved from a group-based communication repository.

In embodiments, group-based communication interaction signal metadata comprises one or more of a user identifier, a group-based communication organization identifier, a group-based communication team identifier, a group-based communication interaction type, a group-based communication interaction source type, a group-based communication interaction source identifier, a group-based communication interaction source identifier, or a timestamp.

In embodiments, a group-based communication interaction type is one of a reaction, a selection, a share, a read, or group-based communication message inclusion.

In embodiments, a group-based communication interaction source type is one of a group-based communication channel, a file, a link, or a group-based communication message.

In embodiments, a group-based communication interaction source identifier is one of agroup-based communication channel identifier, a file identifier, a link identifier, or a group-based communication message identifier.

In embodiments, the first group-based communication interaction signal data structure record comprises a group-based communication interaction source type.

In embodiments, the group-based communication interaction source type comprises group-based communication channel and the group-based communication interaction signal type comprises a read.

In embodiments, the group-based communication interaction source type comprises a link and the group-based communication interaction signal type comprises one of selection or share.

In embodiments, the group-based communication interaction source type comprises a file and the group-based communication interaction signal type comprises one of selection or share.

In embodiments, the group-based communication interaction source type comprises a group-based communication message and the group-based communication interaction signal type comprises one of read, share, reaction, or group-based communication message inclusion.

In embodiments, the group-based communication message comprises message text and wherein a group-based communication sentiment is associated with the group-based communication message.

In embodiments, the apparatus is further configured to parse the group-based communication message text to extract strings representing words and tally each inclusion of each word across all group-based communication messages within the group-based communication system.

In embodiments, the apparatus is further configured to associate a sentiment with each word based on an aggregate sentiment of all group-based communication messages within which the word has been included.

In embodiments, the apparatus is further configured to retrieve one or more group-based communication objects (and therefore associated interaction signals) from a group-based communication repository. In embodiments, a group-based communication server stores 301B/401B the group-based communication data corpus in a group-based communication repository.

In embodiments, the apparatus is further configured to select only those group-based communication interaction signals associated with a common user identifier.

In embodiments, the apparatus is further configured to select only those group-based communication interaction signals associated with a common group-based communication team identifier.

In embodiments, the apparatus is further configured to select only those group-based communication interaction signals associated with a common group-based communication organization identifier.

In embodiments, the apparatus is further configured to select only those group-based communication interaction signals associated with a common group-based communication channel identifier.

In embodiments, the apparatus is further configured to select only those group-based communication interaction signals associated with a timestamp occurring within a defined network time period.

In embodiments, the apparatus is further configured to select only those group-based communication interaction signals associated with a common group-based communication group identifier.

In embodiments, the apparatus is further configured to select only those group-based communication interaction signals associated with a common geolocation identifier.

In embodiments, the apparatus is further configured to select only those group-based communication interaction signals associated with a common organizational title identifier within the group-based communication system.

In embodiments, the apparatus is further configured to select only those group-based communication interaction signals associated with a common organizational role identifier within the group-based communication system.

In embodiments, the apparatus is further configured to select only those group-based communication interaction signals associated with a common organizational tenure identifier within the group-based communication system.

In embodiments, the apparatus is further configured to select only those group-based communication interaction signals associated with a common organizational position identifier within the group-based communication system.

In embodiments, the apparatus is further configured to parse the group-based communication message text to extract strings representing one or more of word pairs or tuples, words associated with particular topics, a group of words associated with a particular topic, or truncation of words or phrases associated with particular topics.

In embodiments, the apparatus is further configured to tally each inclusion of each string across all group-based communication messages within the group-based communication system.

In embodiments, the apparatus is further configured to extract a topic from a plurality of group-based communication interaction signals prior to generating the long term group-based communication interaction signal occurrence tally. In embodiments, the first group-based communication interaction signal data structure record represents the topic.

In embodiments, the apparatus is further configured to generate a topic similarity score for each topic of a plurality of topics associated with the plurality of group-based communication interaction signals.

In embodiments, a topic similarity score for a first topic associated with a second topic represents a programmatically generated measure of how similar the second topic is to the first topic.

In embodiments, the first topic and second topic are associated with a common group-based communication identifier.

In embodiments, the apparatus is further configured to cluster the first topic and second topic together upon determining the topic similarity score exceeds a topic similarity threshold.

In embodiments, the aggregate sentiment is programmatically generated based upon one or more of pre-trained machine learning sets of strings and associated sentiments, a sum of sentiments associated with each word and reaction within the message, and a model comprising sentiments associated with a particular team identifier.

FIGS. 4C and 4D illustrate an exemplary generation 420 of an interaction signal trends interface for use with embodiments of the present disclosure. In embodiments, an apparatus comprises at least one processor and at least one memory storing computer code that, when executed by the at least one processor, causes the apparatus to generate an interaction signal trends interface according to functions described herein.

for each interaction signal of a plurality of interaction signals, extract 421 interaction signal metadata into an interaction signal data structure to produce a plurality of interaction signal data structures. In embodiments, the interaction signal metadata comprises an interaction source type, an interaction source identifier, and an interaction type.

In embodiments, the apparatus is further configured to, for each interaction signal data structure record of the plurality of interaction signal data structures comprising an interaction source identifier associated with a first universal record locator (URL) identifier, generate 422A an interaction signal occurrence divergence measure based at least in part on a predicted short term interaction signal occurrence tally and an actual short term interaction signal occurrence tally.

In embodiments, the apparatus is further configured to assign 422B an interaction signal data structure record rank value to the interaction signal data structure record based at least in part on the interaction signal occurrence divergence measure.

In embodiments, the apparatus is further configured to arrange 423 in an ordered interaction signal data structures list each of the interaction signal data structures in an order according to their interaction signal data structure record rank values.

In embodiments, the apparatus is further configured to transmit 424 an interaction signal trends interface for rendering within a display device of a requesting client device.

In embodiments, the interaction signal trends interface is generated based in part on the ordered interaction signal data structure records list.

In embodiments, the plurality of interaction signals is received (421A) from a plurality of client devices. In embodiments, each client device is associated with a user identifier within a communication system. In embodiments, the plurality of interaction signals is stored (421B) by a communication system in a communication repository.

In embodiments, the apparatus is configured to receive 426 a request for organizational telemetry discovery from a requesting device.

In embodiments, a second interaction signal data structure record of an interaction signal data structure associated with first universal record locator (URL) identifier comprises an interaction type representative of one or more of a selection or a share.

In embodiments, the predicted short term interaction signal occurrence tally based at least part on a long term interaction signal occurrence tally, and the predicted short term interaction signal occurrence tally is representative of a programmatically generated expected number of times an interaction signal associated with the first universal record locator (URL) identifier will occur over a second network time period.

In embodiments, the plurality of interaction signals is received from a plurality of client devices, and each client device is associated with a unique user identifier within a group-based communication system.

In embodiments, the long term interaction signal occurrence tally is representative of a number of times an interaction signal associated with the interaction signal data structure has occurred over a first network time period, and the long term interaction signal occurrence tally is based on long term interaction signal data retrieved from a group-based communication repository.

In embodiments, the actual short term interaction signal occurrence tally is representative of a number of times an interaction signal associated with the interaction signal data structure occurred over the second network time period, and the short term interaction signal occurrence tally is based on short term interaction signal data retrieved from a group-based communication repository.

In embodiments, the interaction signal metadata further comprises one or more of a user identifier, an organization identifier, a team identifier, or a timestamp.

In embodiments, the universal record locator (URL) identifier is associated with universal record locator (URL) text.

In embodiments, the apparatus is further configured to parse the universal record locator (URL) text to extract strings representing words and tally each inclusion of each word across all universal record locator (URL) texts within a group-based communication system, and the interaction signal trends interface is generated based in part on the tally and the universal record locator (URL) text.

In embodiments, sentiment is associated with each word based on an aggregate sentiment of all universal record locator (URL) texts within which the word has been included, and the interaction signal trends interface is generated based in part on one or more identified sentiments associated with the universal record locator (URL) texts.

In embodiments, the apparatus is further configured to select only those interaction signals associated with a common team identifier.

In embodiments, the apparatus is further configured to select only those interaction signals associated with a common organization identifier.

In embodiments, the apparatus is further configured to select only those interaction signals associated with a timestamp occurring within a defined network time period.

In embodiments, the apparatus is further configured to parse the universal record locator (URL) text to extract strings representing one or more of word pairs or tuples, words associated with particular topics, a group of words associated with a particular topic, or truncation of words or phrases associated with particular topics and tally each inclusion of each string across all universal record locator (URL) texts within a group-based communication system. In embodiments, the interaction signal trends interface is generated based in part on the tally and the universal record locator (URL) text.

In embodiments, the universal record locator (URL) text comprises custom shortened universal record locator (URL) text.

In embodiments, a message comprising the universal record locator (URL) identifier is associated with message text.

In embodiments, the apparatus is further configured to parse the message text to extract strings representing words and tally each inclusion of each word across all messages comprising the universal record locator (URL) identifier within a group-based communication system, and the interaction signal trends interface is generated based in part on the tally and the universal record locator (URL) identifier.

In embodiments, sentiment is associated with each word based on an aggregate sentiment of all message texts within which the word has been included.

In embodiments, the apparatus is further configured to parse the message text to extract strings representing one or more of word pairs or tuples, words associated with particular topics, a group of words associated with a particular topic, or truncation of words or phrases associated with particular topics and tally each inclusion of each string across all messages comprising the universal record locator (URL) identifier within a group-based communication system. In embodiments, the interaction signal trends interface is generated based in part on the tally and the message text.

In embodiments, the apparatus is further configured to parse the universal record locator (URL) text to extract a prefix and tally each inclusion of the prefix across all messages comprising the universal record locator (URL) identifier within a group-based communication system. In embodiments, the interaction signal trends interface is generated based in part on the tally and the prefix.

In embodiments, the apparatus is further configured to tally each inclusion of the prefix across only those messages comprising the universal record locator (URL) identifier that are also associated with one or more of a common team identifier, a common group identifier, or a common user identifier within the group-based communication system.

In embodiments, the apparatus is further configured to parse the custom shortened universal record locator (URL) text to extract strings representing one or more of word pairs or tuples, words associated with particular topics, a group of words associated with a particular topic, or truncation of words or phrases associated with particular topics and tally each inclusion of each string across all custom shortened universal record locator (URL) texts within a group-based communication system. In embodiments, the interaction signal trends interface is generated based in part on the tally and the custom shortened universal record locator (URL) text.

FIGS. 5A-5H illustrate exemplary interfaces for presentation of discovered organizational telemetry data for use with embodiments of the present disclosure.

In FIG. 5A, an exemplary group-based communication interaction signal trends interface comprises "Topics," "Links & Files," and "Channels" that are identified as "Trending this week across all departments" in an organization identified as "ACME Corp." For example, a topic identified as "Dogfood" has been identified as trending in accordance with embodiments of the present disclosure. That is, the interaction signal trends interface was generated based in part on an ordered interaction signal data structure records list, where one of the top interaction data signal data structure records was associated with a topic identified as "Dogfood." Similarly, a topic associated with "Emoji 5" may have been near the top of the ordered interaction signal data structure records list. Similarly, a topic associated with "Peer feedback" may have been near the top of the ordered interaction signal data structure records list. The interaction data signals associated with the topic identified as "Dogfood" is rendered along with information indicating that 35 users across 18 group-based communication channels were discussing the topic identified as "Dogfood" (e.g., submitting interaction signals to the group-based communication system that were somehow associated with message text, emojis, URLs, and the like, that were associated with the topic "Dogfood"). The interaction data signals associated with the topic identified as "Emoji 5" is rendered along with information indicating that 35 users across 18 group-based communication channels were discussing the topic identified as "Emoji 5" (e.g., submitting interaction signals to the group-based communication system that were somehow associated with message text, emojis, URLs, and the like, that were associated with the topic "Emoji 5"). The interaction data signals associated with the topic identified as "Peer feedback" is rendered along with information indicating that 35 users across 18 group-based communication channels were discussing the topic identified as "Peer feedback" (e.g., submitting interaction signals to the group-based communication system that were somehow associated with message text, emojis, URLs, and the like, that were associated with the topic "Peer feedback"). The interaction signal trends interface may also comprise links & files that have been identified as trending as described above, as well as channels; all generated in accordance with the methods disclosed herein.

In FIG. 5B, an exemplary group-based communication interaction signal trends interface comprises "Trending Topics," "Trending Links & Files," and "Trending Channels" that are identified as "Trending" "in design" (i.e., associated with a common team identifier) this week "across all workspaces" in an organization identified as "ACME Corp." For example, the interaction signal trends interface comprises trending topics rendered in a slightly different manner as is depicted in FIG. 5B. In FIG. 5B, the interaction signal trends interface is generated based in part on an ordered interaction signal data structure records list, where data structure/data structure records associated with topics identified as "dogfood," "emoji," "peer reviews," "mario," and reviews," likely at the top of the ordered list. The topics are also presented with information such as a percentage of increase of interaction over time, and a number of interaction signals associated therewith (e.g., "dogfood" had "169 mentions" (or interactions) this week; "emoji" had "346 mentions" (or interactions) this week; "peer reviews" had "300 mentions" (or interactions) this week; "mario" had "76 mentions" (or interactions) this week; "reviews" had "111 mentions" (or interactions) this week). In embodiments, the percentage increase as showed in FIG. 5B may be calculated or related to one or more of a predicted short term interaction signal tally, an actual short term interaction signal occurrence tally, or a long term interaction signal occurrence tally associated with interaction signals associated with each of the topics. FIG. 5B illustrates trending links & files, and trending channels, generated in a similar fashion as described herein.

In FIGS. 5C and 5D, an exemplary group-based communication interaction signal trends interface comprises a drill-down into a Topic identified as 'Trending" from the interface in FIG. 5B. The interfaces in FIGS. 5C and 5D illustrate "Popularity Over Time" for the topic of "Peer Reviews," a sentiment associated with the topic, related topics, and message highlights associated with the topic. For example, in FIG. 5C, the topic identified as "peer reviews," as illustrated in FIGS. 5B, has been selected for more granular rendering. The interface presented in FIGS. 5C and 5D illustrate the "popularity over time" of the topic identified as "peer reviews," which can be understood to mean, in embodiments, a rendering of historical interaction signal trend information associated with the topic "peer reviews." FIG. 5C also renders "sentiment" associated with "peer reviews," for example by illustrating that "People feel good about peer reviews." Such sentiment is generated in accordance with methods disclosed herein. FIGS. 5C and 5D additionally render "related topics" and "relevant channels" associated with "peer reviews." These are generated and rendered based upon additional interaction signals and ordered interaction signal record data structures lists generated in accordance with methods disclosed herein.

In FIG. 5E, an exemplary group-based communication interaction signal trends interface comprises a drill-down into a Channel identified as "Trending" from the interface in FIG. 5B. The interface in FIG. 5E illustrates "Member Activity" within the channel "#design-team," as well as a number of reactions posted within the channel. The interface also includes message highlights from the channel. The interface presented in FIG. 5E is generated based upon interaction signals associated with the channel "#design-team." That is, "People are checking this channel quite often" may represent that interaction signals comprising "views" associated with the channel "#design-team" may have increased "21% from the previous week." Further, 54 members have generated interaction signals comprising "reads" associated with the channel "#design-team," 21 members have generated interaction signals comprising "writing" associated with the channel "#design-team." Additionally, more interaction signals comprising "reactions" (or the use of emojis in response to a displayed object) occurred associated with the channel "#design-team" in the last week (e.g., 367 reactions were made by 65 people).

In FIGS. 5F and 5G an exemplary group-based communication interaction signal trends interface comprises "Trending Topics," "Trending Links & Files," and "Trending Channels" that are identified as "Trending" "in design" (i.e., associated with a common team identifier) this week "across all workspaces" in an organization identified as "ACME Corp." The interfaces rendered in FIGS. 5F and 5G are generated in accordance with the embodiments described herein, and similar to those presented in FIGS. 5A and 5B.

In FIG. 5H, an exemplary group-based communication interaction signal trends interface comprises a drill-down into a Channel identified as "Trending" from the interface in FIG. 5G. The interface in FIG. 5H illustrates a "Read Score" for the channel "#design-team," as well as a number of reactions (and the top reactions) posted within the channel.

The "Read Score" is generated based upon interaction signals associated with the channel that represent reading of a posted message or opening of messages. The number of reactions and top reactions are selected based upon interaction signals associated with the channel that comprise the use of emojis in response to posted objects. The interface also includes message highlights from the channel. The interface presented in FIG. 5E is generated based upon interaction signals associated with the channel "#design-team." Interaction signals comprising "channel opens" associated with the channel "#design-team" may have increased "350%" over the last 30 days. Further, 54 members have generated interaction signals comprising "reads" associated with the channel "#design-team," 21 members have generated interaction signals comprising "writing" associated with the channel "#design-team."

FIGS. 6A-6F illustrate exemplary attention score interfaces and attention score trend interfaces for use with embodiments of the present disclosure. For example, a "Marketing department" may be associated with more interaction signals that are associated with the displayed trending topics rendered in FIG. 6A because user identifiers associated with the marketing department have been generating interaction signals associated with topics identified as those presented in FIG. 6A. Further, "Marketing department" may be associated with more interaction signals that are associated with the displayed trending channels rendered in FIG. 6A because user identifiers associated with the marketing department have been generating interaction signals associated with channels identified as those presented in FIG. 6A. FIG. 6B illustrates an interface generated based in part on attention scores associated with members associated with the "information technology group," and the attention scores for those members aggregated as associated with other organization groups (e.g., A-H). That is, interaction signals associated with members associated with the "information technology group" that are associated with any one of the other organization groups can be aggregated such that the interface in FIG. 6B may be rendered. FIGS. 6C-6E similarly render attention score based information associated with a particular group of an organization, and are generated based upon embodiments disclosed herein.

FIG. 7 illustrates an exemplary network graph rendered within group-based communication interfaces for use with embodiments of the present disclosure. FIG. 7 may be generated based in part upon attention scores associated with each of groups identified as Sales, Marketing, Engineering, and Design.

FIGS. 8A-8H illustrate exemplary attention score interfaces and attention score trend interfaces according to embodiments of the present disclosure. The interfaces presented in FIGS. 8A-8H illustrate granularity options by which a user may limit data presented in an attention score interface or an interaction signal trends interface.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conclusion

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising at least one processor and at least one memory storing computer code that, when executed by the at least one processor, causes the apparatus to:

receive a plurality of communication messages transmitted between at least two users of a plurality of users of a communication system, wherein the plurality of users are associated with a group identifier and access within the communication system to the plurality of communication messages is facilitated based at least in part on the group identifier;

identify, based on the plurality of communication messages, one or more links shared between or accessed by the plurality of users;

generate an interaction signal occurrence divergence measure for each link of the one or more links based at least in part on a predicted short term interaction signal occurrence tally and an actual short term interaction signal occurrence tally, wherein the predicted short term interaction signal occurrence tally comprises a predicted number of times that a link of the one or more links will be shared or accessed by the plurality of users over a period of time and the actual short term interaction signal occurrence tally comprises an actual number of times the link was shared or accessed by the plurality of users over the period of time;

determine, based at least in part on respective interaction signal occurrence divergence measures, one or more anomalous links of the one or more links shared between or accessed by the plurality of users; and transmit, for rendering and based at least in part on determining the one or more anomalous links, a user interface comprising the one or more anomalous links, wherein the user interface includes a subsection comprising the one or more anomalous links, and further wherein the user interface comprises context data indicating a communication channel of the communication system in which an individual anomalous link was shared or accessed.

2. The apparatus of claim 1, wherein the predicted short term interaction signal occurrence tally is based at least part on a long term interaction signal occurrence tally, and wherein the predicted short term interaction signal occurrence tally is representative of a programmatically generated expected number of times an interaction signal associated with the link of the one or more links will occur over a second network time period.

3. The apparatus of claim 2, wherein the long term interaction signal occurrence tally is representative of a number of times an interaction signal has occurred over a first network time period, and wherein the long term interaction signal occurrence tally is based on long term interaction signal data retrieved from a repository maintained by the communication system.

4. The apparatus of claim 3, wherein the actual short term interaction signal occurrence tally is representative of a number of times an interaction signal occurred over the second network time period, and wherein the actual short term interaction signal occurrence tally is based on short term interaction signal data retrieved from a repository maintained by the communication system.

5. The apparatus of claim 1, wherein the plurality of communication messages are received from a plurality of client devices, and wherein each client device is associated with a unique user identifier within the communication system.

6. The apparatus of claim 1, wherein metadata associated with each communication message of the plurality of communication messages comprises one or more of a user identifier, an organization identifier, a team identifier, or a timestamp.

7. The apparatus of claim 1, wherein each link of the one or more links is associated with universal record locator (URL) text.

8. The apparatus of claim 7, further caused to parse the universal record locator (URL) text to extract strings representing words and tally each inclusion of each word across all universal record locator (URL) texts within the communication system, wherein the user interface is generated based in part on the tally and the universal record locator (URL) text.

9. The apparatus of claim 8, wherein sentiment is associated with each word based on an aggregate sentiment of all universal record locator (URL) texts within which a word has been included, and wherein the user interface is generated based at least in part on one or more identified sentiments associated with the universal record locator (URL) texts.

10. The apparatus of claim 7, further caused to:
parse the universal record locator (URL) text to extract strings representing one or more of word pairs or tuples, words associated with particular topics, a group of words associated with a particular topic, or truncations of words or phrases associated with particular topics; and
tally each inclusion of each string across all universal record locator (URL) texts within the communication system, wherein the user interface is generated based at least in part on the tally and the universal record locator (URL) text.

11. The apparatus of claim 7, wherein the universal record locator (URL) text comprises custom shortened universal record locator (URL) text.

12. The apparatus of claim 11, further caused to:
parse the custom shortened universal record locator (URL) text to extract strings representing one or more of word pairs or tuples, words associated with particular topics, groups of words associated with a particular topic, or truncations of words or phrases associated with particular topics; and
tally each inclusion of each string across all custom shortened universal record locator (URL) texts within the communication system, wherein the user interface is generated based in part on the tally and the custom shortened universal record locator (URL) text.

13. The apparatus of claim 7, further caused to:
parse the universal record locator (URL) text to extract a prefix; and
tally each inclusion of the prefix across a first subset of the plurality of communication messages comprising a link of the one or more links within the communication system, wherein the user interface is generated based in part on the tally and the prefix.

14. The apparatus of claim 13, further caused to:
tally each inclusion of the prefix across a second subset of the plurality of communication messages that include the link and that are also associated with one or more of a common team identifier, a common group identifier, or a common user identifier within the communication system.

15. The apparatus of claim 1, wherein the context data comprises a selectable control configured to cause presentation, via the user interface, of the communication channel in which the individual anomalous link was shared or accessed.

16. The apparatus of claim 1, wherein the plurality of communication messages are received from a plurality of client devices associated with a common organization identifier.

17. The apparatus of claim 1, wherein the plurality of communication messages are associated with a timestamp occurring within a defined network time period.

18. The apparatus of claim 1, wherein text of a communication message of the plurality of communication messages comprises a link of the one or more links.

19. The apparatus of claim 18, further caused to parse the text of the communication message to extract strings representing words and tally each inclusion of each word across a subset of the plurality of communication messages comprising the link within the communication system, wherein the user interface is generated based in part on the tally and the link.

20. The apparatus of claim 19, wherein sentiment is associated with each word based on an aggregate sentiment of communication message texts within which the word has been included.

21. The apparatus of claim 18, further caused to:
parse the text of the communication message to extract strings representing one or more of word pairs or tuples, words associated with particular topics, groups of words associated with a particular topic, or truncations of words or phrases associated with particular topics; and
tally each inclusion of each string across a subset of the plurality of communication messages comprising the link within the communication system, wherein the user interface is generated based in part on the tally and the text of the communication message.

22. A computer program product comprising at least one computer-readable storage medium storing computer code that, with an apparatus, cause the apparatus to:
receive a plurality of communication messages transmitted between at least two users of a plurality of users of a communication system, wherein the plurality of users are associated with a group identifier and access within the communication system to the plurality of communication messages is facilitated based at least in part on the group identifier;
identify, based on the plurality of communication messages, one or more links shared between or accessed by the plurality of users;
generate an interaction signal occurrence divergence measure for each link of the one or more links based at least in part on a predicted short term interaction signal occurrence tally and an actual short term interaction signal occurrence tally, wherein the predicted short term interaction signal occurrence tally comprises a predicted number of times that a link of the one or more links will be shared between or accessed by the plurality of users over a period of time and the actual short term interaction signal occurrence tally comprises an actual number of times the link was shared between or accessed by the plurality of users over the period of time;
determine, based at least in part on respective interaction signal occurrence divergence measures, one or more anomalous links of the one or more links shared between or accessed by the plurality of users; and
transmit, for rendering and based at least in part on determining the one or more anomalous links, a user interface comprising the one or more anomalous links, wherein the user interface includes a subsection comprising the one or more anomalous links, and
further wherein the user interface comprises context data indicating a communication channel of the communication system in which an individual anomalous link was shared or accessed.

23. The computer program product of claim 22, wherein the plurality of communication messages are received from a plurality of client devices, and wherein each client device is associated with a unique user identifier within the communication system.

24. A computer-implemented method, comprising:
receiving a plurality of communication messages transmitted between at least two users of a plurality of users of a communication system, wherein the plurality of users are associated with a group identifier and access within the communication system to the plurality of communication messages is facilitated based at least in part on the group identifier;
identifying, based on the plurality of communication messages, one or more links shared between or accessed by the plurality of users;
generating an interaction signal occurrence divergence measure for each link of the one or more links based at least in part on a predicted short term interaction signal occurrence tally and an actual short term interaction signal occurrence tally, wherein the predicted short term interaction signal occurrence tally comprises a predicted number of times that a link of the one or more links will be shared between or accessed by the plurality of users over a period of time and the actual short term interaction signal occurrence tally comprises an actual number of times the link was shared between or accessed by the plurality of users over the period of time;
determining, based at least in part on respective interaction signal occurrence divergence measures, one or more anomalous links of the one or more links shared between or accessed by the plurality of users; and
transmitting, for rendering and based at least in part on determining the one or more anomalous links, a user interface comprising the one or more anomalous links, wherein the user interface includes a subsection comprising the one or more anomalous links, and
further wherein the user interface comprises context data indicating a communication channel of the communication system in which an individual anomalous link was shared or accessed.

* * * * *